(12) United States Patent
Zhuang

(10) Patent No.: US 11,199,448 B2
(45) Date of Patent: Dec. 14, 2021

(54) SPECTROSCOPIC MEASUREMENT DEVICE AND SPECTROSCOPIC MEASUREMENT METHOD

(71) Applicant: SONY CORPORATION, Tokyo (JP)

(72) Inventor: Tuo Zhuang, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/052,362

(22) PCT Filed: Apr. 23, 2019

(86) PCT No.: PCT/JP2019/017313
§ 371 (c)(1),
(2) Date: Nov. 2, 2020

(87) PCT Pub. No.: WO2019/216213
PCT Pub. Date: Nov. 14, 2019

(65) Prior Publication Data
US 2021/0055160 A1    Feb. 25, 2021

(30) Foreign Application Priority Data

May 11, 2018   (JP) .............................. JP2018-092593

(51) Int. Cl.
*G01J 3/28*    (2006.01)
*G01J 3/36*    (2006.01)
*G01J 3/02*    (2006.01)

(52) U.S. Cl.
CPC .............. *G01J 3/36* (2013.01); *G01J 3/0229* (2013.01); *G01J 3/2823* (2013.01); *G01J 3/0237* (2013.01)

(58) Field of Classification Search
CPC ........ G01J 3/36; G01J 3/28; G01J 3/14; G01J 3/18; G01J 3/02; G01J 3/0229;
(Continued)

(56) References Cited

U.S. PATENT DOCUMENTS 6,907,390 B1    6/2005 Reffner et al.
2006/0202178 A1  9/2006 Chen et al.
(Continued)

FOREIGN PATENT DOCUMENTS

CN    107407597 A    11/2017
EP     1159640 A1    12/2001
(Continued)

OTHER PUBLICATIONS

International Search Report and Written Opinion of PCT Application No. PCT/JP2019/017313, dated Jul. 23, 2019, 09 pages of ISRWO.

(Continued)

*Primary Examiner* — Abdullahi Nur
(74) *Attorney, Agent, or Firm* — Chip Law Group

(57) ABSTRACT

To implement a configuration for enabling independent adjustment of a spatial resolution and a wavelength resolution of a spectroscopic measurement device. A spatial resolution adjustment unit configured to adjust a spatial resolution of the spectroscopic measurement device, and a wavelength resolution adjustment unit configured to adjust a wavelength resolution of the spectroscopic measurement device are included, and the spatial resolution adjustment unit maintains output light from a condensing unit to a spectroscopic imaging unit of the spectroscopic measurement device as parallel light, adjusts a parameter of a constituent element of the condensing unit, and changes the spatial resolution without changing the wavelength resolution of the spectroscopic measurement device. The wavelength resolution adjustment unit adjusts a parameter of a spectroscopic imaging unit of the spectroscopic measurement device and changes the wavelength resolution without changing the spatial resolution of the spectroscopic measurement device.

10 Claims, 20 Drawing Sheets

(58) Field of Classification Search
CPC .......... G01J 3/2823; G01J 3/0237; G01J 3/04;
G01J 3/0208
See application file for complete search history.

(56) References Cited

U.S. PATENT DOCUMENTS

2008/0049293 A1    2/2008  Deck
2010/0219327 A1*   9/2010  Arbore .................. G01N 21/55
                                                    250/206

FOREIGN PATENT DOCUMENTS

| | | |
|---|---|---|
| EP | 2062016 A2 | 5/2009 |
| EP | 3245491 A1 | 11/2017 |
| JP | 2002-532726 A | 10/2002 |
| JP | 2010-502958 A | 1/2010 |
| JP | 2010-276552 A | 12/2010 |
| WO | 2000/036440 A1 | 6/2000 |
| WO | 2008/027930 A2 | 3/2008 |
| WO | 2016/115018 A1 | 7/2016 |

OTHER PUBLICATIONS

Habel, et al., "Practical Spectral Photography", Computer graphics forum: Journal of the European Association for Computer Graphics, EUROGRAPHICS, vol. 31, No. 2, May 1, 2012, pp. 449-458.
Christopher Paul Tebow, "A Tunable Snapshot Imaging Spectrometer", Degree thesis of doctor of philosophy of the university of Arisona, Dec. 2005, 24 pages.
Dwight, et al., "Lenslet Array Tunable Snapshot Imaging Spectrometer (LATIS) for Hyperspectral Fluorescence Microscopy", Biomedical Optics Express, vol. 8, No. 3, Mar. 1, 2017, pp. 1950-1964.

* cited by examiner

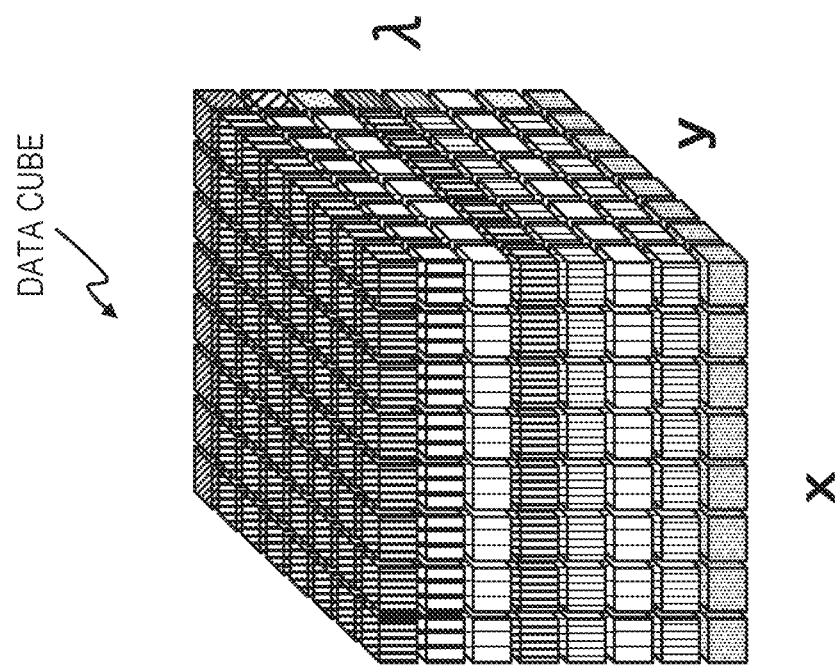

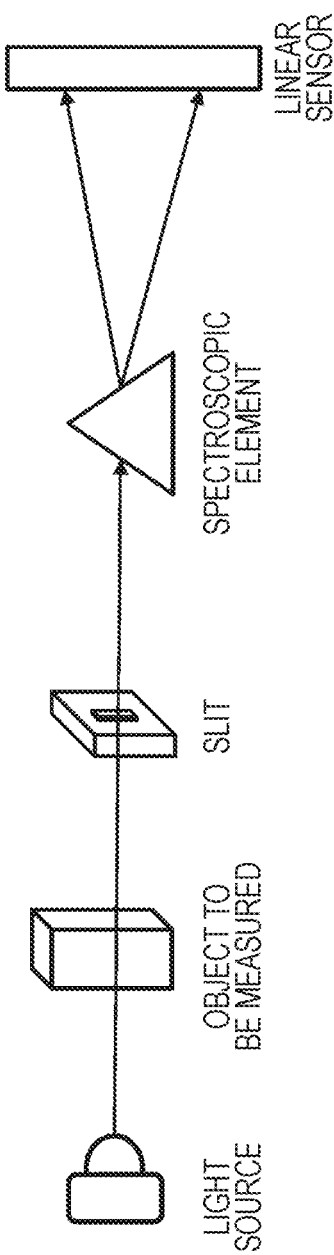
FIG. 7A POINT MEASUREMENT METHOD CONFIGURATION
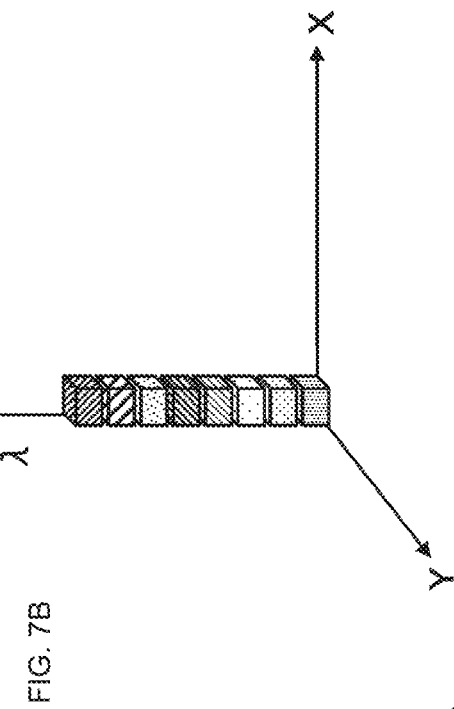
FIG. 7B POINT MEASUREMENT METHOD MEASUREMENT DATA

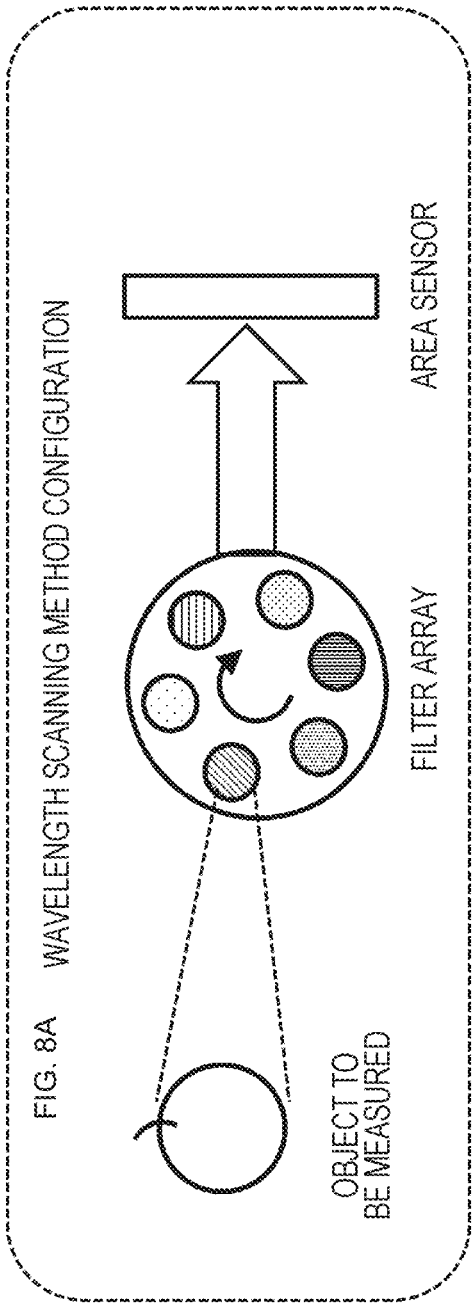
FIG. 8A WAVELENGTH SCANNING METHOD CONFIGURATION
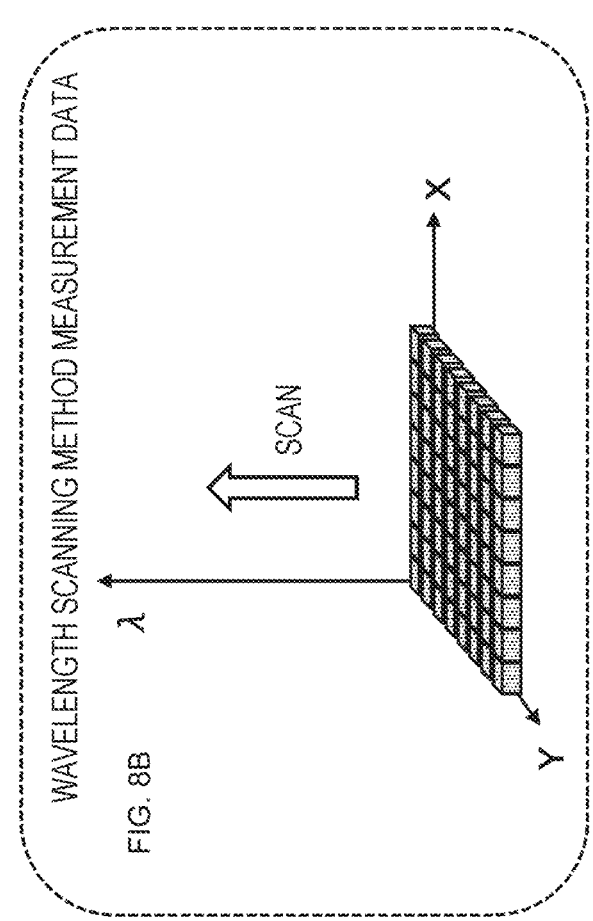
FIG. 8B WAVELENGTH SCANNING METHOD MEASUREMENT DATA

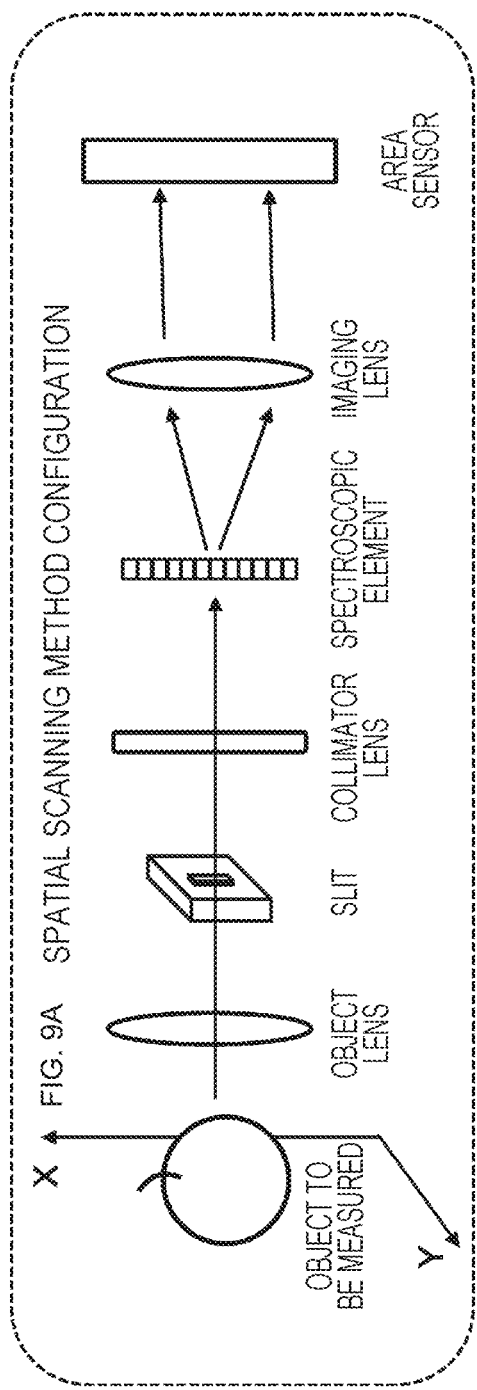
FIG. 9A SPATIAL SCANNING METHOD CONFIGURATION
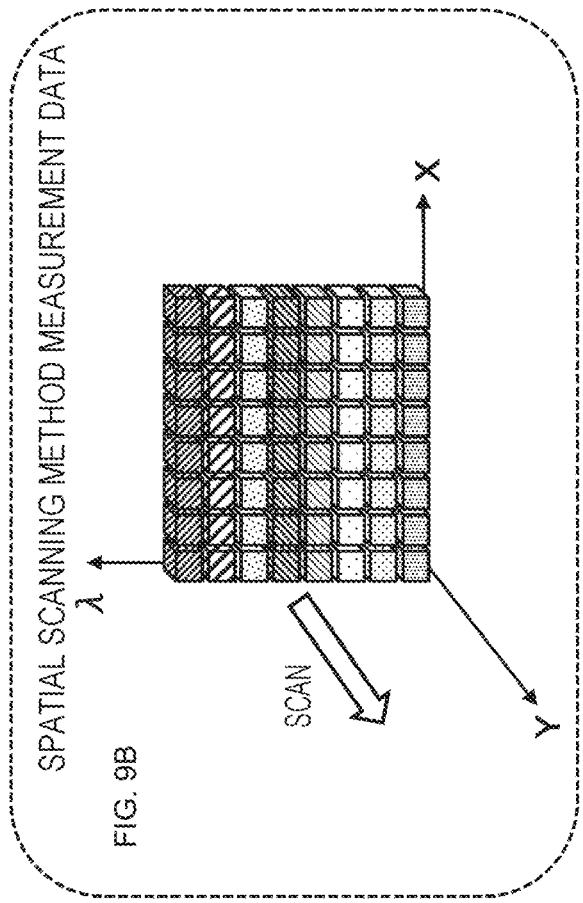
FIG. 9B SPATIAL SCANNING METHOD MEASUREMENT DATA

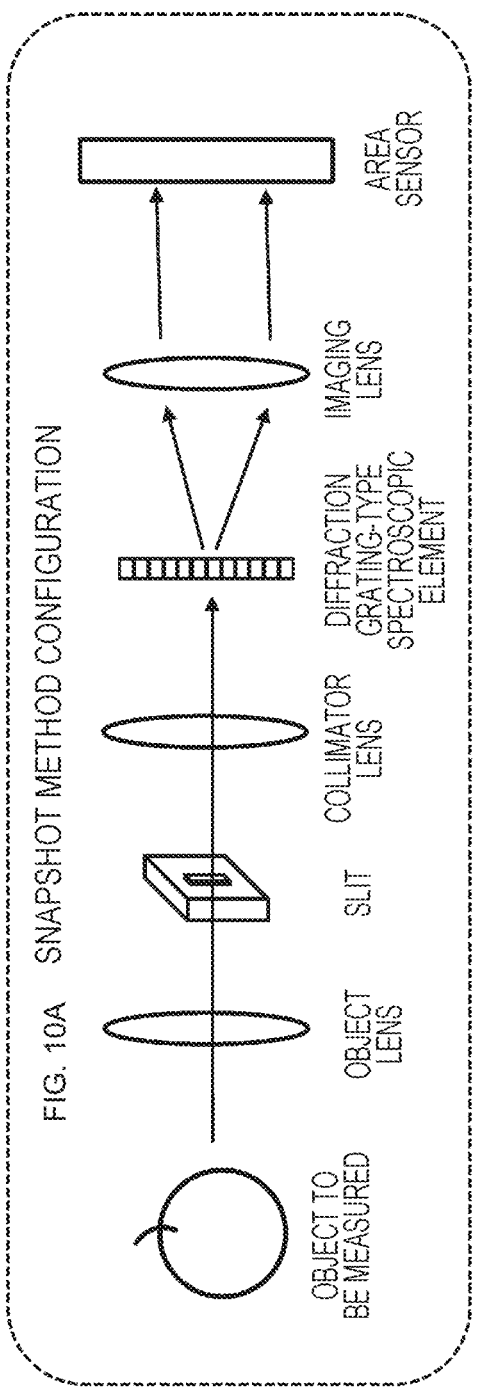
FIG. 10A SNAPSHOT METHOD CONFIGURATION
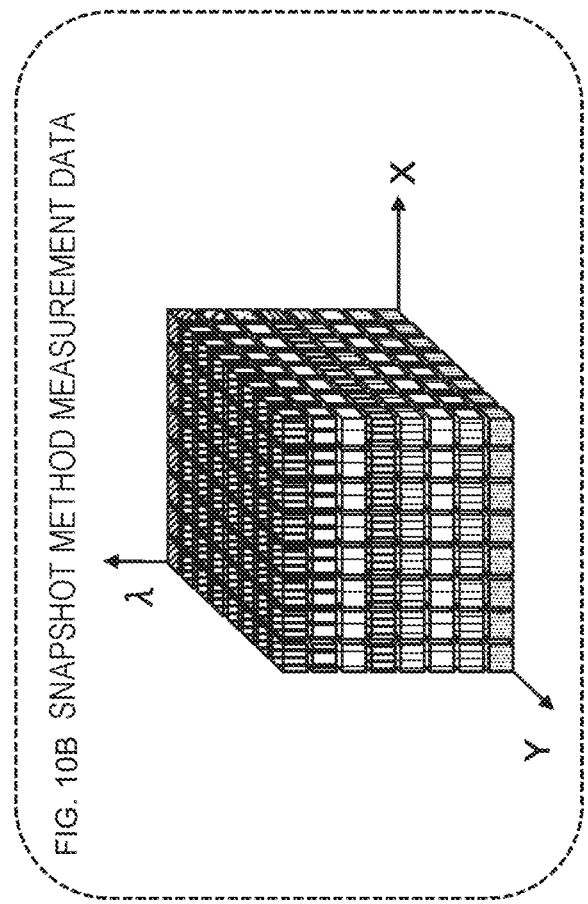
FIG. 10B SNAPSHOT METHOD MEASUREMENT DATA

FIG. 17

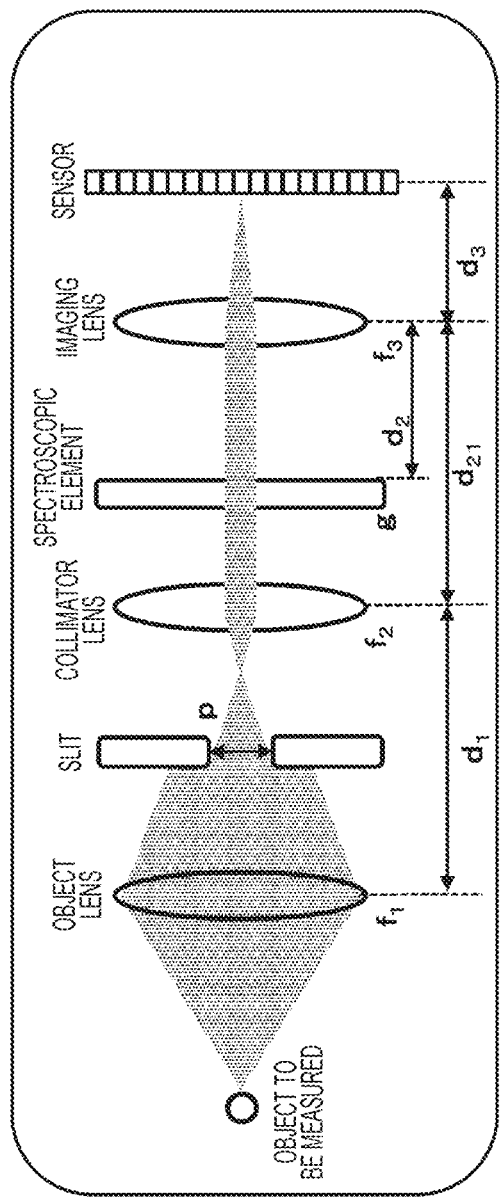

| | | ADJUSTMENT TARGET BY SPATIAL RESOLUTION ADJUSTMENT UNIT | ADJUSTMENT TARGET BY WAVELENGTH RESOLUTION ADJUSTMENT UNIT |
|---|---|---|---|
| (1) | OBJECTIVE LENS FOCAL LENGTH $f_1$ | ADJUST | — |
| (2) | DISTANCE $d_1$ BETWEEN OBJECT LENS AND COLLIMATOR LENS | ADJUST | — |
| (3) | SLIT OPENING DIAMETER $p$ | — | — |
| (4) | COLLIMATOR LENS FOCAL LENGTH $f_2$ | ADJUST | — |
| (5) | SPECTROSCOPIC ELEMENT (DIFFRACTION GRATING) OPENING DIAMETER $g$ | — | — |
| (6) | DISTANCE $d_2$ BETWEEN SPECTROSCOPIC ELEMENT AND IMAGING LENS | — | ADJUST |
| (7) | DISTANCE $d_{21}$ BETWEEN COLLIMATOR LENS AND IMAGING LENS | — | — |
| (8) | IMAGING LENS FOCAL LENGTH $f_3$ | — | — |
| (9) | DISTANCE $d_3$ BETWEEN IMAGING LENS AND SENSOR | — | — |

FIG. 18

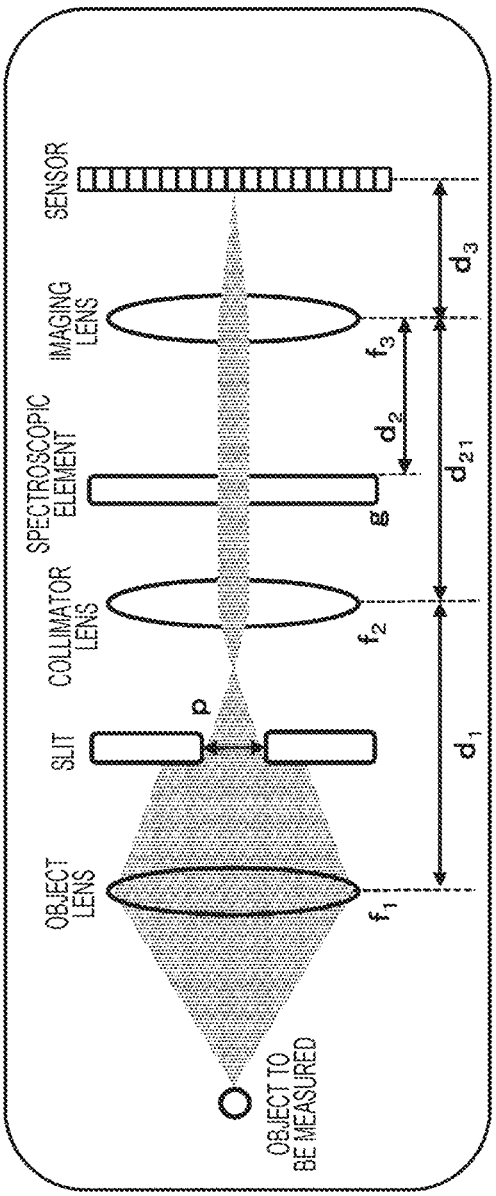

| | | ADJUSTMENT TARGET BY SPATIAL RESOLUTION ADJUSTMENT UNIT | ADJUSTMENT TARGET BY WAVELENGTH RESOLUTION ADJUSTMENT UNIT |
|---|---|---|---|
| (1) | OBJECTIVE LENS FOCAL LENGTH $f_1$ | ADJUST | ADJUST |
| (2) | DISTANCE $d_1$ BETWEEN OBJECT LENS AND COLLIMATOR LENS | ADJUST | — |
| (3) | SLIT OPENING DIAMETER $p$ | ADJUST | — |
| (4) | COLLIMATOR LENS FOCAL LENGTH $f_2$ | ADJUST | — |
| (5) | SPECTROSCOPIC ELEMENT (DIFFRACTION GRATING) OPENING DIAMETER $g$ | — | — |
| (6) | DISTANCE $d_2$ BETWEEN SPECTROSCOPIC ELEMENT AND IMAGING LENS | — | ADJUST |
| (7) | DISTANCE $d_{21}$ BETWEEN COLLIMATOR LENS AND IMAGING LENS | — | — |
| (8) | IMAGING LENS FOCAL LENGTH $f_3$ | — | ADJUST |
| (9) | DISTANCE $d_3$ BETWEEN IMAGING LENS AND SENSOR | — | ADJUST |

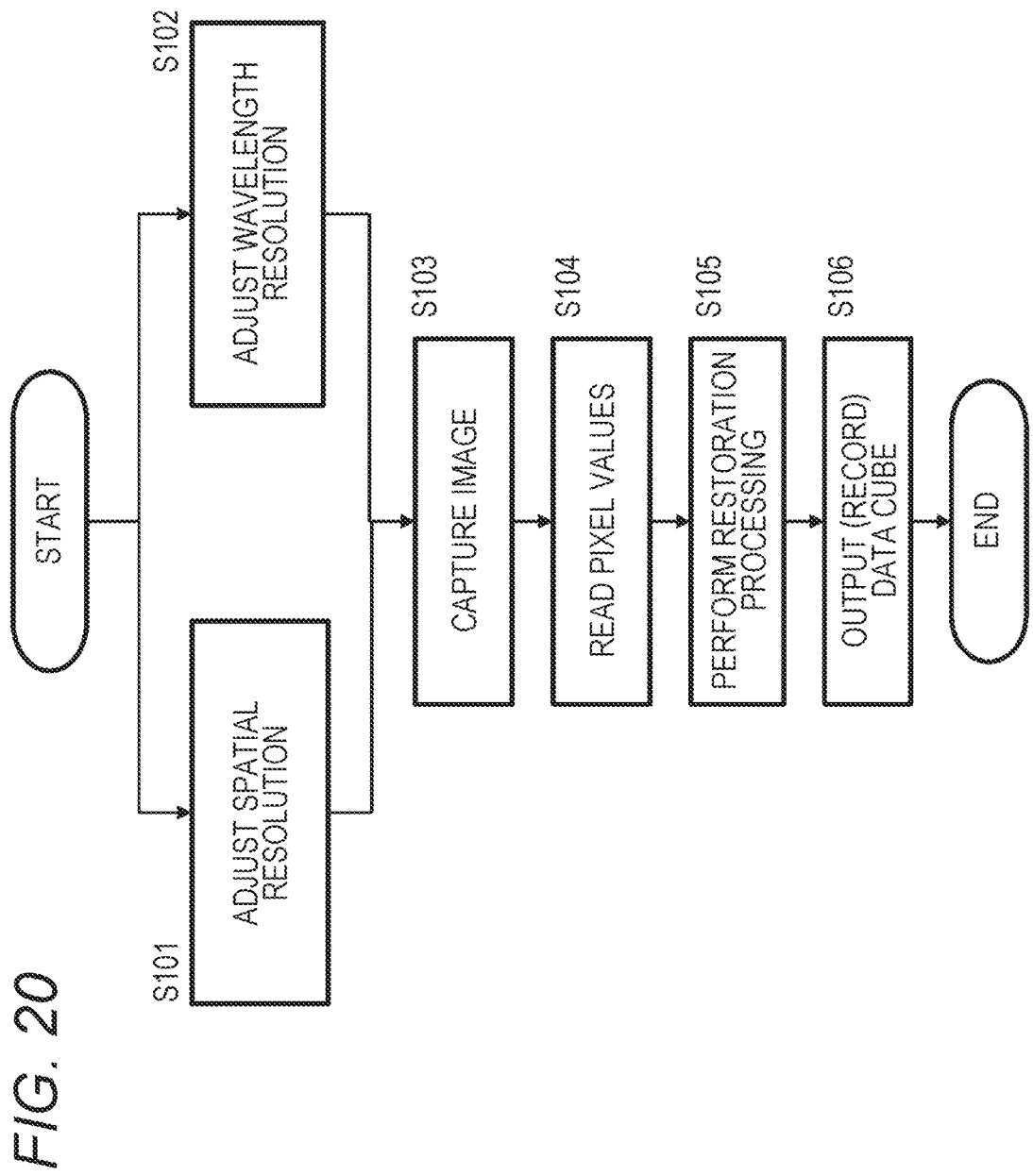

SPECTROSCOPIC MEASUREMENT DEVICE AND SPECTROSCOPIC MEASUREMENT METHOD

CROSS REFERENCE TO RELATED APPLICATIONS

This application is a U.S. National Phase of International Patent Application No. PCT/JP2019/017313 filed on Apr. 23, 2019, which claims priority benefit of Japanese Patent Application No. JP 2018-092593 filed in the Japan Patent Office on May 11, 2018. Each of the above-referenced applications is hereby incorporated herein by reference in its entirety.

TECHNICAL FIELD

The present disclosure relates to a spectroscopic measurement device and a spectroscopic measurement method. More specifically, the present disclosure relates to a spectroscopic measurement device and a spectroscopic measurement method for analyzing compositions and the like of various objects to be measured.

BACKGROUND ART

Spectroscopic measurement methods are known as object composition analysis techniques. A spectroscopic measurement method is a technique of analyzing a composition (an element, a molecular structure, or the like) of an object by analyzing radiated light, reflected light, or transmitted light from the object.

The radiated light, reflected light, or transmitted light from the object has different light wavelength components depending on the composition (an element, a molecular structure, or the like) of the object, and the composition of the object can be analyzed by analyzing the wavelength components. In general, data indicating a quantity for each wavelength is called a wavelength spectrum, and processing of measuring a wavelength spectrum is called spectroscopic measurement processing.

However, even if wavelength information of the light (radiated light, reflected light, or transmitted light) from a certain point on the object is analyzed, only the composition at the one point can be analyzed. That is, to analyze the composition of each point on a surface of the object by single observation, it is necessary to analyze all the light from each point on the surface.

To analyze the composition of each point on the surface of the object, it is necessary to acquire corresponding data of spatial information and wavelength information of the object.

As a method of acquiring the corresponding data of spatial information and wavelength information of the object by single processing, that is, by only single capture processing by a spectroscopic measurement device, a snapshot method is known. A spectroscopic measurement device to which the snapshot method is applied is configured by a combination of an optical system including a plurality of lenses, a slit (field diaphragm), a spectroscopic element, and the like, and a sensor. A spatial resolution and a wavelength resolution of the spectroscopic measurement device are determined by the configurations of the optical system and sensor.

Note that, regarding the spectroscopic measurement device to which the snapshot method is applied is described in, for example, Non-Patent Document 1 (Practical Spectral Photography Ralf Habel, Michael Kudenov, Michael Wimmer, EUROGRAPHICS 2012), Non-Patent Document 2 (A Tunable Snapshot Imaging Spectrometer Tebow, Christopher, Degree thesis of doctor of philosophy of the university of Arisona, 2005), Non-Patent Document 3 (Lenslet Array Tunable Snapshot Imaging Spectrometer (LATIS) for Hyperspectral Fluorescence Microscope JASON G. DWIGHT, TOMASZ S. TKACZYK, BIOMEDICAL OPTICS EXPRESS, Vol. 8, No. 3, 1 Mar. 2017), and the like.

However, the devices described in these documents and other conventional spectroscopic measurement devices do not have a configuration capable of independently adjusting the spatial resolution and the wavelength resolution, and in a case where an object to be measured or measurement use is different, there is a need to perform processing such as replacing the entire device and reconfiguring a device having a desired spatial resolution and wavelength resolution.

CITATION LIST

Non-Patent Document

Non-Patent Document 1: Practical Spectral Photography Ralf Habel, Michael Kudenov, Michael Wimmer, EUROGRAPHICS 2012

Non-Patent Document 2: A Tunable Snapshot Imaging Spectrometer Tebow, Christopher, Degree thesis of doctor of philosophy of the university of Arisona, 2005

Non-Patent Document 3: Lenslet Array Tunable Snapshot Imaging Spectrometer (LATIS) for Hyperspectral Fluorescence Microscope JASON G. DWIGHT, TOMASZ S. TKACZYK, BIOMEDICAL OPTICS EXPRESS, Vol. 8, No. 3, 1 Mar. 2017

SUMMARY OF THE INVENTION

Problems to be Solved by the Invention

The present disclosure has been made in view of the above problems, for example, and an object of the present disclosure is to provide a spectroscopic measurement device and a spectroscopic measurement method for enabling independent adjustment of a spatial resolution and a wavelength resolution.

Solutions to Problems

The first aspect of the present disclosure resides in a spectroscopic measurement device including:

a spatial resolution adjustment unit configured to adjust a spatial resolution of the spectroscopic measurement device; and a wavelength resolution adjustment unit configured to adjust a wavelength resolution of the spectroscopic measurement device, in which the spatial resolution adjustment unit changes the spatial resolution without changing the wavelength resolution of the spectroscopic measurement device.

Moreover, the second aspect of the present disclosure resides in a spectroscopic measurement method executed by a spectroscopic measurement device, the method including:

a spatial resolution adjustment step of adjusting, by a spatial resolution adjustment unit, a spatial resolution of the spectroscopic measurement device;

a wavelength resolution adjustment step of adjusting, by a wavelength resolution adjustment unit, a wavelength resolution of the spectroscopic measurement device;

an image imaging step of causing a sensor to receive output light of an object to be measured via a condensing unit and a spectroscopic unit of the spectroscopic measurement device; and a data cube generation step of generating, by an arithmetic processing unit, a data cube including three-dimensional data in a spatial direction (XY) and a wavelength direction (λ) of the object to be measured on the basis of a pixel value of the sensor, in which the spatial resolution adjustment step by the spatial resolution adjustment unit is a step of changing the spatial resolution without changing the wavelength resolution of the spectroscopic measurement device.

Still other objects, features, and advantages of the present disclosure will become clear from more detailed description based on examples and attached drawings of the present disclosure to be described below. Note that a system in the present specification is a logical aggregate configuration of a plurality of devices, and is not limited to devices having respective configurations within the same housing.

Effect of the Invention

According to a configuration of an embodiment of the present disclosure, a configuration for enabling independent adjustment of a spatial resolution and a wavelength resolution of a spectroscopic measurement device is implemented.

Specifically, for example, a spatial resolution adjustment unit configured to adjust a spatial resolution of the spectroscopic measurement device, and a wavelength resolution adjustment unit configured to adjust a wavelength resolution of the spectroscopic measurement device are included, and the spatial resolution adjustment unit maintains output light from a condensing unit to a spectroscopic imaging unit of the spectroscopic measurement device as parallel light, adjusts a parameter of a constituent element of the condensing unit, and changes the spatial resolution without changing the wavelength resolution of the spectroscopic measurement device. The wavelength resolution adjustment unit adjusts a parameter of a spectroscopic imaging unit of the spectroscopic measurement device and changes the wavelength resolution without changing the spatial resolution of the spectroscopic measurement device.

With the present configuration, the configuration for enabling independent adjustment of the spatial resolution and the wavelength resolution of the spectroscopic measurement device is implemented.

Note that the effects described in the present specification are merely examples and are not limited, and additional effects may be exhibited.

BRIEF DESCRIPTION OF DRAWINGS

FIG. 6 is a diagram for describing an example of a data cube that is three-dimensional data of an object to be measured in a spatial direction (XY) and a wavelength direction (λ).

FIGS. 7A and 7B are diagrams for describing a point measurement method (spectrometer).

FIGS. 8A and 8B are diagrams for describing a wavelength scanning method.

FIGS. 9A and 9B are diagrams for describing a spatial scanning method.

FIGS. 10A and 10B are diagrams for describing a snapshot method.

FIG. 17 is a diagram for describing optical parameters adjusted by a spatial resolution adjustment unit and a wavelength resolution adjustment unit of the spectroscopic measurement device of the present disclosure.

FIG. 18 is a diagram for describing the optical parameters adjusted by the spatial resolution adjustment unit and the wavelength resolution adjustment unit of the spectroscopic measurement device of the present disclosure.

FIG. 20 is a diagram illustrating a flowchart for describing a processing sequence executed by the spectroscopic measurement device of the present disclosure.

MODE FOR CARRYING OUT THE INVENTION

Hereinafter, details of a spectroscopic measurement device and a spectroscopic measurement method of the present disclosure will be described with reference to the drawings. Note that the description will be given according to the following items.

Figure 1:
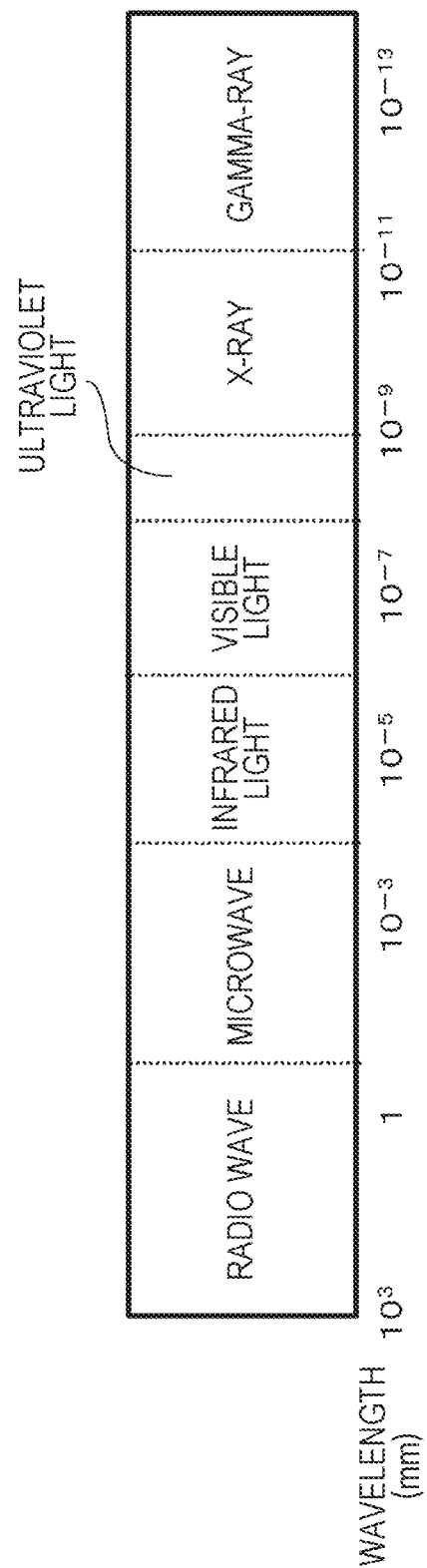
FIG. 1 is a diagram for describing a relationship between a type of light and a wavelength.

1. Outline of Spectroscopic Measurement Device
2. Configuration Example of Snapshot-type Spectroscopic Measurement Device Using Diffraction Grating
3. Configuration and Processing of Spectroscopic Measurement Device of Present Disclosure
4. Data Cube Restoration Processing in Arithmetic Processing Unit
5. Sequence of Processing Executed by Spectroscopic Measurement Device of Present Disclosure
6. Conclusion of Configuration of Present Disclosure 1. Outline of Spectroscopic Measurement Device First, an outline of a spectroscopic measurement device will be described. Light is known to be, for example, infrared light (infrared radiation), visible light (visible light), ultraviolet light (ultraviolet), or the like. These types of light are types of electromagnetic waves and have different wavelengths (vibration cycles) depending on the types of light, as illustrated in FIG. 1.

There are characteristics that the wavelength of visible light is in a range of about 400 nm to 700 nm, and infrared light (infrared radiation) has a longer wavelength than visible light while having a shorter wavelength than ultraviolet light (ultraviolet).

As described above, radiated light, reflected light, or transmitted light from an object has different light wavelength components depending on the composition (an element, a molecular structure, or the like) of the object, and the composition of the object can be analyzed by analyzing the wavelength components. In general, data indicating a quantity for each wavelength is called a wavelength spectrum, and processing of measuring a wavelength spectrum is called spectroscopic measurement processing.

Figure 2:
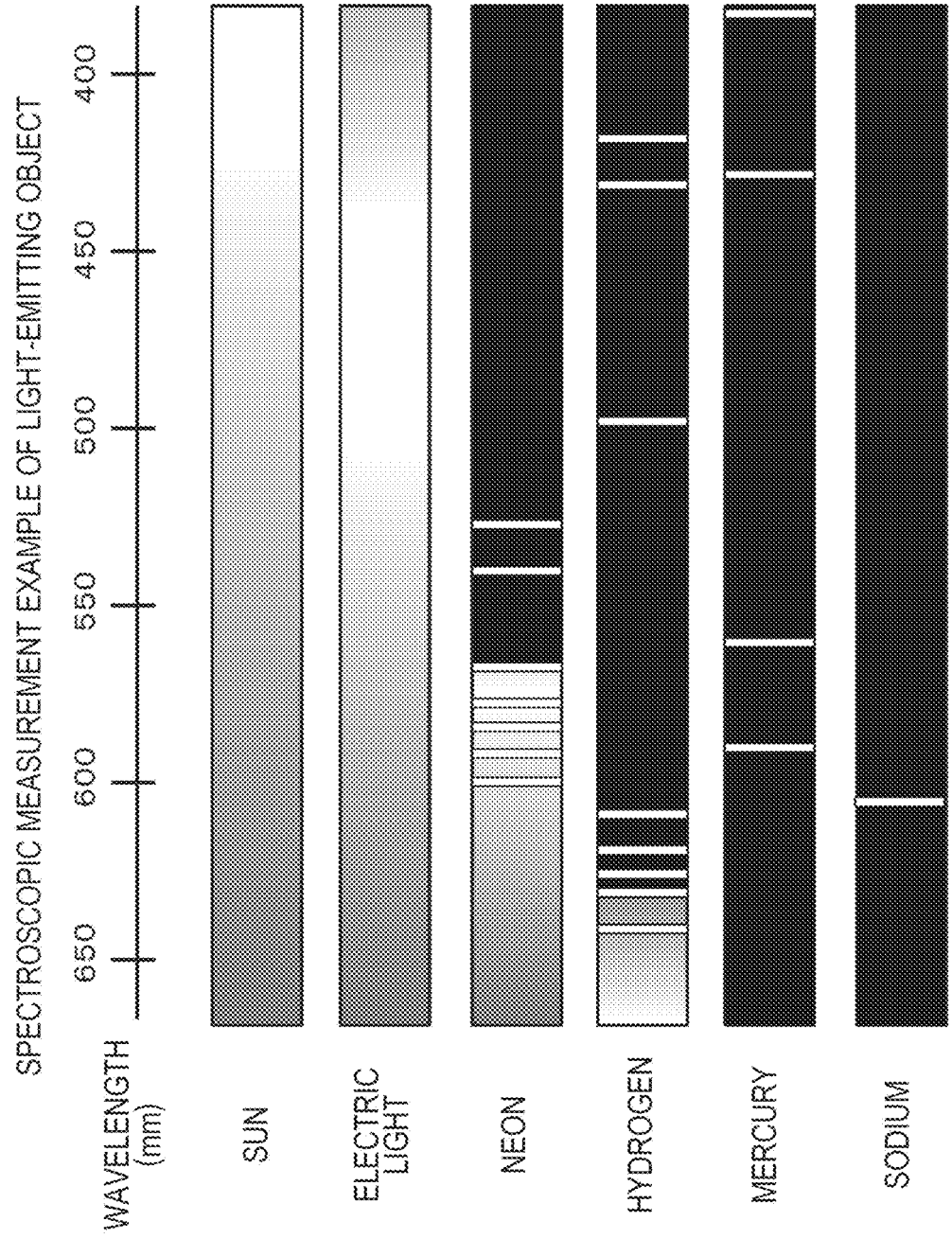
FIG. 2 is a diagram for describing an example of spectroscopic measurement of a light-emitting object.

FIG. 2 is a diagram illustrating a spectroscopic measurement example of a light-emitting object. FIG. 2 illustrates which wavelengths of light in the wavelength range (about 400 nm to 700 nm) of visible light are emitted from the sun, electric light, neon, hydrogen, mercury, and sodium. A region with an output is displayed whitish and a region without an output is illustrated in black. FIG. 2 illustrates results of spectroscopic measurement of sunlight and output light from an electric light and various heated substances.

As illustrated in FIG. 2, each object of the sun, electric light, neon, hydrogen, mercury, and sodium outputs wavelength light unique to each object.

That is, even if an object is unknown, the composition of the object can be analyzed by analyzing the wavelength components included in the light from the object.

Figure 3:
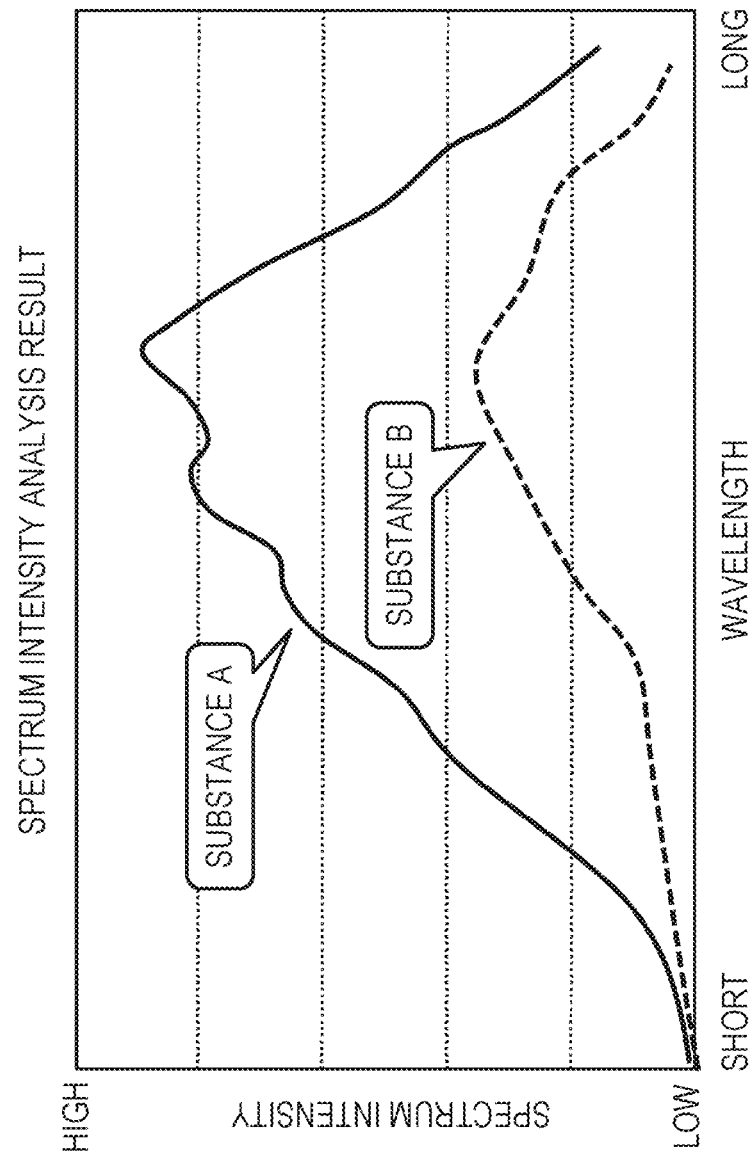
FIG. 3 is a diagram illustrating an example of a spectrum intensity analysis result that is a spectroscopic analysis result of output light of a food product.

For example, in a case where the composition of a processed food product is unknown, substances that make up the food product can be analyzed by analyzing output light (radiated light, reflected light, or transmitted light) of the food product. FIG. 3 is a diagram illustrating an example of a spectrum intensity analysis result that is a spectroscopic analysis result of output light of a food product. Two different spectrum analysis results are obtained from this food product.

By comparing this spectrum intensity analysis result with spectrum intensity analysis result data already analyzed for various substances, what a substance A and a substance B are can be determined, and the composition of the food product can be analyzed.

As described above, various types of information regarding an object to be measured can be acquired if spectroscopic measurement can be performed.

However, in a general camera having a condenser lens and a sensor, light with a mixture of all wavelengths enters each pixel of the sensor. Therefore, an analysis of the intensity of each wavelength unit is difficult.

Therefore, an observation system for spectroscopic measurement is provided with a spectroscopic element (spectroscopic device) for separating the light of each wavelength from the light entering the camera.

Figure 4:
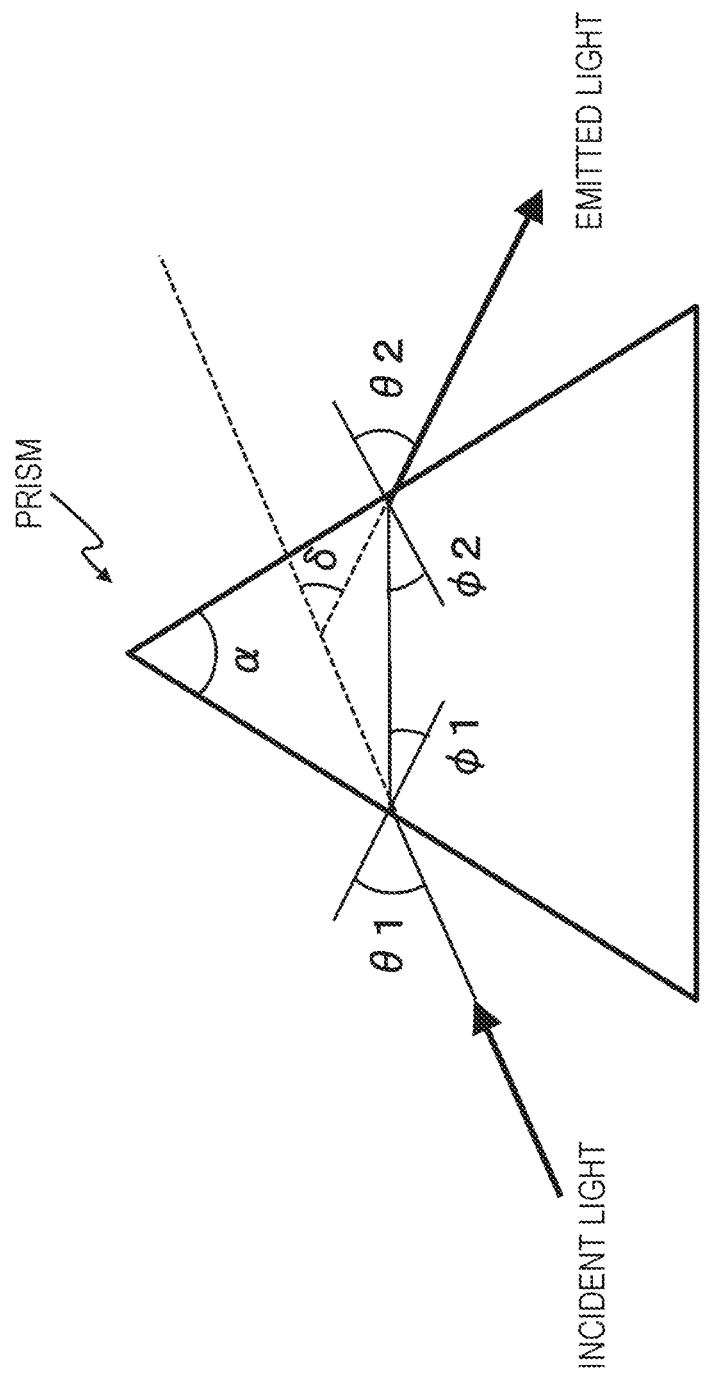
FIG. 4 is a diagram for describing a prism that is a spectroscopic element.

The most commonly known spectroscopic element is a prism illustrated in FIG. 4. Light incident on the prism, that is, light of various wavelengths contained in the incident light is emitted from the prism at an emission angle corresponding to a wavelength of the incident light, an incident angle, and the prism shape. The observation system for spectroscopic measurement is provided with a spectroscopic element such as the prism, and has a configuration capable of individually receiving light in wavelength units by a sensor.

Note that, in spectroscopy using a prism having a refractive index n, an expression representing a change in light in a traveling direction by the prism can be expressed as (Expression 1) below.

$$\delta = \theta_1 - \varphi_1 + \theta_2 - \varphi_2 = \theta_1 + \theta_2 - \alpha \quad \text{(Expression 1)}$$

Note that the parameters in (Expression 1) above are as follows:

α: a vertical angle of the prism;

$\theta_1$: an incident angle with respect to a prism incident surface;

$\theta_2$: an emission angle with respect to a prism emission surface;

$\varphi_1$: a refraction angle at the prism incident surface;

$\varphi_2$: a refraction angle at the prism emission surface; and

δ: a deflection angle (an angle between the incident light and the emitted light)

Here, according to the Snell's law (sin $\theta_j$=n sin $\Phi_j$), (Expression 1) above can be rewritten as (Expression 2) below:

$$\delta = \theta_1 + \sin^{-1}(n \cdot \sin(\alpha - \varphi_1)) \quad \text{(Expression 2)}$$

Note that, in (Expression 2) above, n: the refractive index of the prism, and the refractive index n depends on the wavelength. Furthermore, $\varphi_1$: a refraction angle at the prism incident surface depends on the refractive index n of the prism and the incident angle $\theta_1$ with respect to the prism incident surface.

Therefore, the deflection angle (the angle between the incident light and the emitted light) δ depends on the incident angle $\theta_1$ and the wavelength.

Figure 5:
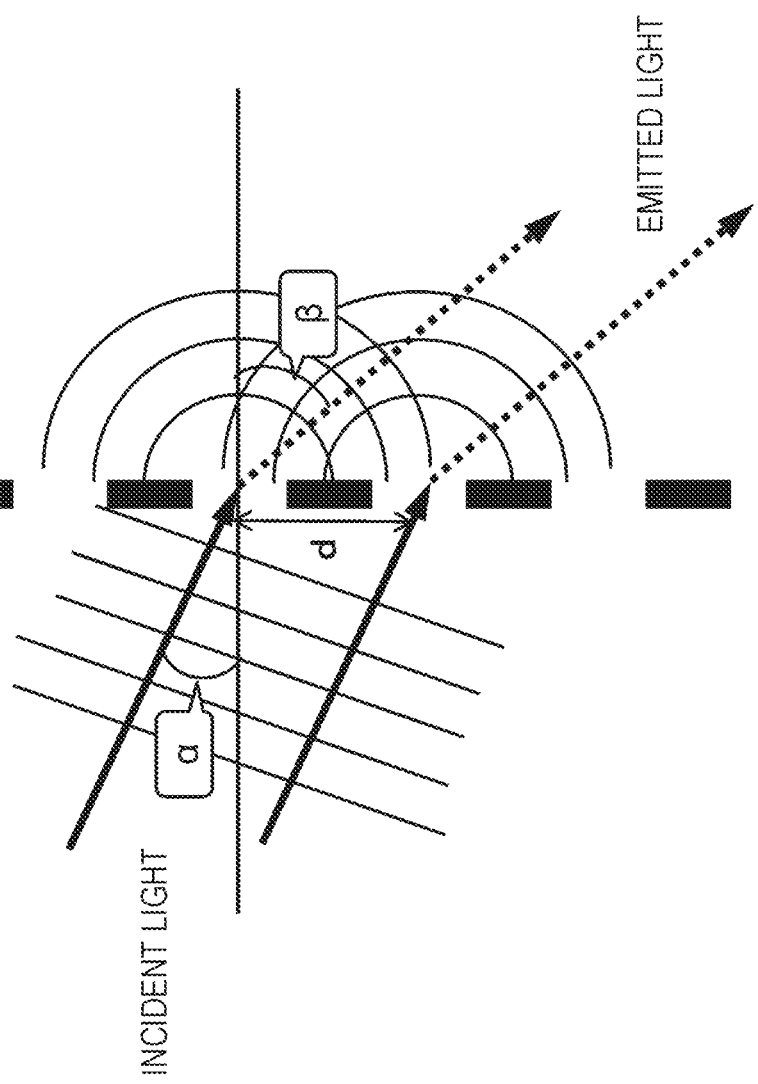
FIG. 5 is a diagram for describing a description grating that is a spectroscopic element.

Furthermore, as illustrated in FIG. 5, spectroscopy using a diffraction grating using a property of light as a wave is also possible. An emission angle β of a light beam from the diffraction grating can be expressed by (Expression 3) below.

$$\beta = \sin^{-1}(((m \cdot \lambda)/d) - \sin \alpha) \quad \text{(Expression 3)}$$

Note that, in (Expression 3) above, d: a lattice spacing,

α: an incident angle,

β: emission angle, and m: a diffraction order.

However, even if the wavelength information of the light from a certain point on the object is analyzed, only the composition at the one point can be analyzed, as described above. That is, to analyze the composition of each point on a surface of the object by single observation, it is necessary to analyze all the light from each point on the surface.

That is, to analyze the composition of each point on a surface of an object to be measured, three-dimensional data of the object to be measured in a spatial direction (XY) and a wavelength direction (λ) needs to be acquired by single observation.

FIG. 6 illustrates an example of the three-dimensional data, that is, a data cube of the object to be measured in the spatial direction (XY) and the wavelength direction (λ).

The data cube is three-dimensional data of the object to be measured in the spatial direction (XY) and the wavelength direction (λ). The data cube is data in which coordinates of each point on the surface of the object to be measured are indicated by XY coordinates, and the intensity (λ) of wavelength light at each coordinate position (x, y) is recorded. The data cube illustrated in FIG. 6 is configured by 8×8×8 cube data, and one cube is data indicating the light intensity of a specific wavelength (λ) at the specific position (x, y).

Note that the number of cubes of 8×8×8 is an example, and this number will vary depending on the spatial resolution or wavelength resolution of the spectroscopic measurement device.

Examples of existing spectroscopic measurement systems that acquire a data cube, that is, three-dimensional data in the spatial direction (XY) and the wavelength direction (λ) of the object to be measured, as illustrated in FIG. 6, will be described.

The existing spectroscopic measurement systems that acquire three-dimensional data of the object to be measured in the spatial direction (XY) and the wavelength direction (λ) are classified into the following four types:

(a) a point measurement method (spectrometer);
(b) a wavelength scanning method;
(c) a spatial scanning method; and
(d) a snapshot method.

Hereinafter, an outline of each of the methods will be described below.

(a) Point measurement method (spectrometer)

The point measurement method (spectrometer) will be described with reference to FIGS. 7A and 7B.

As illustrated in FIG. 7A, the point measurement method has a configuration to diffract light emitted from one point of the object to be measured using a prism as a spectroscopic element, and project diffracted light on a linear sensor having elements arranged in only one direction. With the configuration, different wavelength light is recorded in a different element (pixel) on the linear sensor.

A wavelength spectrum can be acquired by reading a value of each element (pixel) of the sensor. The characteristic of the point measurement method (spectrometer) is that the wavelength resolution depends on the element size (the number of pixels) of the linear sensor, and the more the number of elements (number of pixels), the more detailed wavelength information can be acquired.

However, the point measurement method (spectrometer) can receive and analyze only the light emitted from one point of the object to be measured by single imaging processing. That is, as illustrated in FIG. 7B, wavelength information (λ) of only one point in the spatial direction (XY) of the object to be measured can be obtained by single imaging processing. Therefore, to obtain the wavelength information (λ) of various points in the spatial direction (XY) of the object to be measured, the imaging and analysis need to be performed many times while shifting a measurement (b) Wavelength scanning method Next, the wavelength scanning method will be described with reference to FIGS. 8A and 8B.

As illustrated in FIG. 8A, the wavelength scanning method has a configuration to switch a plurality of optical sensors having different wavelength passing characteristics for each time in front of a camera (area sensor (two-dimensional sensor)) and capture an image.

As illustrated in FIG. 8B, it is possible to acquire intensity information of one wavelength corresponding to a plurality of spatial positions by single imaging, and it is possible to acquire intensity information of a plurality of different wavelengths by switching the optical filter and capture an image.

However, to realize a high wavelength resolution, it is necessary to prepare a large number of different filters, and switch the filters and capture an image, which causes a problem that measurement time becomes long. Furthermore, there is a problem that a wavelength band that cannot be acquired is present due to the characteristics of the optical filters.

(c) Spatial scanning method

Next, the spatial scanning method will be described with reference to FIGS. 9A and 9B.

As illustrated in FIG. 9A, the spatial scanning method has a configuration to record light from an object to be measured diffracted by a spectroscopic element (a prism, a diffraction grating, or the like) in one direction in the space, which is set as an X direction of the area sensor, and in a wavelength direction, which is set as a Y direction of the area sensor. Moreover, as illustrated in FIG. 9B, the measurement device scans the object to be measured in the remaining one direction. By the processing, the data cube described above with reference to FIG. 6, that is, the three-dimensional data cube in the spatial direction (XY) and the wavelength direction (λ) of the object to be measured can be acquired.

The spatial scanning method can realize high spatial resolution and wavelength resolution but the spatial scanning method has a problem that a large device is required for scanning and a scan processing time is required, resulting in a long measurement time.

(d) Snapshot method

Next, the snapshot method will be described with reference to FIGS. 10A and 10B.

As illustrated in FIG. 10A, the snapshot method has a configuration to collect light from an object to be measured using an objective lens, convert the light into parallel light using a collimator lens, and cause the parallel light to be transmitted through a spectroscopic element to project light on a surface of a sensor (area sensor). With the configuration, light of different wavelength components from different points on the object to be measured is recorded in different elements (pixels) on the surface of the sensor (area sensor).

By the snapshot method, the data cube described with reference to FIG. 6, that is, the three-dimensional data cube in the spatial direction (XY) and the wavelength direction (λ) of the object to be measured as illustrated in FIG. 10B can be acquired by single imaging.

However, since the sensor (area sensor) is finite and the information in the wavelength direction is recorded on the surface of the sensor in an overlapping manner, processing of restoring the data cube by signal processing is required after the imaging. Furthermore, since parameters required for the signal processing are in conjunction with the configuration and performance of the optical system of the spectroscopic measurement device, the parameters need to be used while the optical system is fixed in the conventional configuration, which causes a problem that adjustment of the wavelength and the spatial resolution in accordance with an application purpose is difficult.

Note that, as an application example of the snapshot method illustrated in FIG. 10, a configuration to spatially arrange optical filters having different transmission bands on a sensor and acquire a data cube has also been proposed. However, the sensor area is finite but the optical filters need to be mounted on the sensor, which causes a problem that the spatial resolution of the sensor decreases due to mounting of the optical filters.

Note that, as an application example of the snapshot method illustrated in FIGS. 10A and 10B, a configuration to spatially arrange optical filters having different transmission bands on a sensor and acquire a data cube has also been proposed. However, the sensor area is finite but the optical filters need to be mounted on the sensor, which causes a problem that the spatial resolution of the sensor decreases due to mounting of the optical filters.

Examples of existing spectroscopic measurement systems that acquire three-dimensional data in the spatial direction (XY) and the wavelength direction (λ) of the object to be measured, that is, the four types of methods including (a) the point measurement method (spectrometer), (b) the wavelength scanning method, (c) the spatial scanning method, and (d) the snapshot method have been described with reference to FIGS. 7A, 7B, 8A, 8B, 9A, 9B, 10A and 10B.

Among the four methods, (d) the snapshot method described with reference to FIGS. 10A and 10B are particularly useful because the data cube can be acquired by single imaging.

However, all of the above four methods have a problem that control of the spatial resolution and the wavelength resolution is difficult. In particular, there is a problem that individual and independent control of the spatial resolution and the wavelength resolution is difficult.

[2. Configuration Example of Snapshot-type Spectroscopic Measurement Device Using Diffraction Grating]

The spectroscopic measurement device of the present disclosure has similar constituent elements to the snapshot method using a diffraction grating described with reference to FIGS. 10A and 10B, and can individually and independently control the spatial resolution and the wavelength resolution. An example of the spectroscopic measurement device of the present disclosure has a configuration capable of individually and independently controlling the spatial resolution and the wavelength resolution using a computed tomography imaging spectrometer (CTIS) to which the snapshot method is applied.

The snapshot-type spectroscopic measurement device using the diffraction grating described with reference to FIGS. 10A and 10B are already known, and some configurations have been proposed. First, an outline of the proposals will be briefly described.

The configurations described in the following documents will be sequentially described.

(1) Non-Patent Document 1: "Practical Spectral Photography Ralf Habel, Michael Kudenov, Michael Wimmer, EUROGRAPHICS 2012"

(2) Non-Patent Document 2: "A Tunable Snapshot Imaging Spectrometer Tebow, Christopher, Degree thesis of doctor of philosophy of the university of Arisona, 2005"

(3) Non-Patent Document 3: "Lenslet Array Tunable Snapshot Imaging Spectrometer (LATIS) for Hyperspectral Fluorescence Microscope JASON G. DWIGHT, TOMASZ S. TKACZYK, BIOMEDICAL OPTICS EXPRESS, Vol. 8, No. 3, 1 Mar. 2017"

The spectroscopic measurement device described in (1) Non-Patent Document 1 "Practical Spectral Photography Ralf Habel, Michael Kudenov, Michael Wimmer, EUROGRAPHICS 2012" adopts the above-described CTIS optical configuration, and has a configuration capable of acquiring a data cube by single imaging with a fixed resolution.

The disclosed configuration of Non-Patent Document 1 enables acquisition of a data cube by single shot, but the spatial resolution and the wavelength resolution are fixed. In other words, it is necessary to replace the entire optical system according to a change in a use scene such as changing the spatial resolution or the wavelength resolution.

To solve the problem, the configuration described in Non-Patent Document 2 "A Tunable Snapshot Imaging Spectrometer Tebow, Christopher, Degree thesis of doctor of philosophy of the university of Arisona, 2005" or in Non-Patent Document 3 "Lenslet Array Tunable Snapshot Imaging Spectrometer (LATIS) for Hyperspectral Fluorescence Microscope JASON G. DWIGHT, TOMASZ S. TKACZYK, BIOMEDICAL OPTICS EXPRESS, Vol. 8, No. 3, 1 Mar. 2017" has been devised.

The spectroscopic measurement device described in Non-Patent Document 2 uses an optical phase array instead of a general diffraction grating as a spectroscopic element, thereby electrically changing a lattice spacing. Thereby, a projection position of an image on a sensor surface for each wavelength can be dynamically changed. With the configuration, the wavelength resolution can be adjusted.

However, although the configuration in Non-Patent Document 2 enables adjustment of the wavelength resolution, a problem is that the spatial resolution cannot be adjusted.

Furthermore, the spectroscopic measurement device described in Non-Patent Document 3 has a configuration in which the objective lens in the configuration in Non-Patent Document 1 is replaced with a lens array including a plurality of lenses. The spectroscopic measurement device has enabled adjustment of a size of a projected image for each wavelength on a sensor surface by simultaneously changing focal lengths of a collimator lens and an imaging lens at the time of capturing the image, using the lens array configuration. Furthermore, overlapping between projected images can be avoided by rotating the lens array. With the configuration, the spatial resolution and the wavelength resolution can be adjusted at the same time.

With the configuration in Non-Patent Document 3, the spatial resolution and the wavelength resolution can be adjusted at the same time. However, since the focuses of the collimator lens and the imaging lens are adjusted at the same time, there is a problem that the spatial resolution and the wavelength resolution cannot be independently adjusted.

3. Configuration and Processing of Spectroscopic Measurement Device of Present Disclosure The spectroscopic measurement device of the present disclosure solves the above problems. That is, the spectroscopic measurement device enables independent adjustment of the spatial resolution and the wavelength resolution, and implements spectroscopic measurement with the spatial resolution and the wavelength resolution adapted to various applications.

Figure 11:
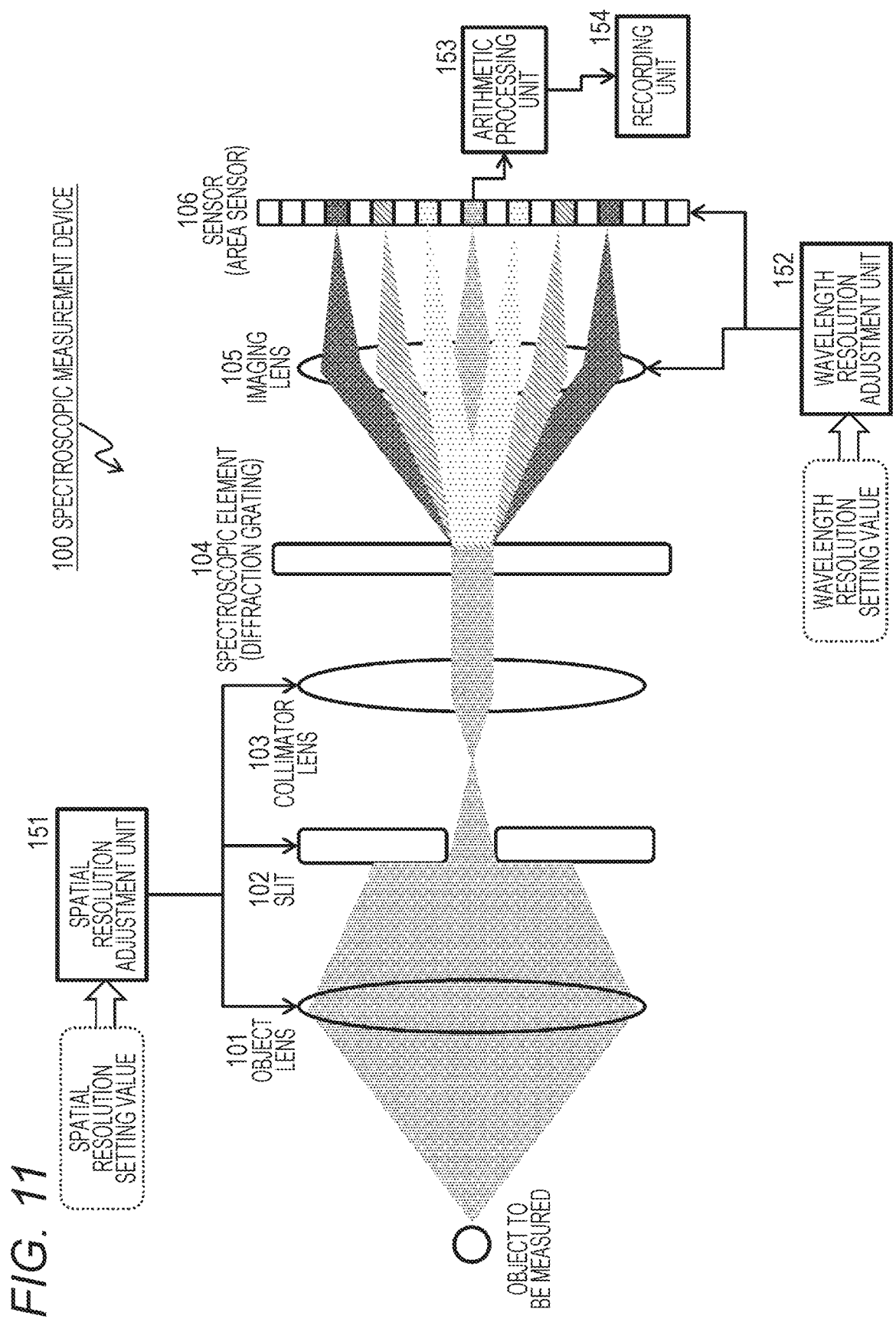
FIG. 11 is a diagram for describing a configuration example of a spectroscopic measurement device 100 according to the present disclosure.

FIG. 11 is a diagram illustrating a configuration example of a spectroscopic measurement device 100 according to the present disclosure.

As illustrated in FIG. 11, the spectroscopic measurement device 100 of the present disclosure includes an objective lens 101, a slit (field diaphragm) 102, a collimator lens 103, a spectroscopic element (diffraction grating) 104, an imaging lens 105, and a sensor (area sensor) 106. Moreover, the spectroscopic measurement device 100 includes a spatial resolution adjustment unit 151, a wavelength resolution adjustment unit 152, an arithmetic processing unit 153, and a recording unit 154.

Basic configurations of the objective lens 101, the slit (field diaphragm) 102, the collimator lens 103, the spectroscopic element (diffraction grating) 104, the imaging lens 105, and the sensor (area sensor) 1060 are similar to the configurations of the snapshot-type spectroscopic measurement device described above with reference to FIGS. 10A and 10B.

The spectroscopic measurement device 100 illustrated in FIG. 11 has a configuration to collect light from an object to be measured using the objective lens 101, convert the transmitted light via the slit (field diaphragm) 102 into parallel light using the collimator lens 103, and further diffract the light transmitted through the spectroscopic element (diffraction grating) 104 to light in wavelength units and project the light on a surface of the sensor (area sensor) 106, using the imaging lens 105. With the configuration, light of different wavelength components from different points on the object to be measured is recorded in different elements (pixels) on the surface of the sensor (area sensor) 106.

Light in which various wavelength lights from various positions on the object to be measured are superimposed is recorded in each element (pixel) of the sensor (area sensor) 106.

The arithmetic processing unit 153 executes arithmetic processing of acquiring an output value (pixel value) of each element (pixel) of the sensor (area sensor) 106 and restoring the position (x, y) of the object to be measured and the wavelength light (λ: spectrum information) corresponding to each position on the basis of the output value of each element (pixel).

That is, the arithmetic processing unit 153 generates a three-dimensional data cube in the spatial direction (XY) and the wavelength direction (λ) of the object to be measured described above with reference to FIG. 6, and records the data cube in the recording unit 154.

The spatial resolution adjustment unit 151 is a processing unit that adjusts the spatial resolution of the spectroscopic measurement device 100. The spatial resolution adjustment unit 151 controls the objective lens 101, the slit (field diaphragm) 102, and the collimator lens 103 to adjust the spatial resolution of the spectroscopic measurement device 100.

The wavelength resolution adjustment unit 152 controls the imaging lens 105 and the sensor (area sensor) 106 to control the wavelength resolution.

A specific control example will be described below in detail.

The spectroscopic measurement device 100 of the present disclosure illustrated in FIG. 11 performs spectroscopic measurement by the snapshot method, similarly to the configuration described above with reference to FIGS. 10A and 10B, and can acquire the data cube described with reference to FIG. 6, that is, the three-dimensional data cube in the spatial direction (XY) and the wavelength direction (λ) of the object to be measured as illustrated in FIG. 10B by single imaging.

Note that the spectroscopic measurement device 100 of the present disclosure illustrated in FIG. 11 has a configuration of capable of capturing a normal image and a spectral image at the same time. Originally, both spatial information and wavelength information exist as continuous quantities, but since discrete data is recorded in the sensor (area sensor) 106, only discrete values are obtained in the spatial direction and the wavelength direction from output values of the sensor (area sensor) 106. Therefore, the concept of resolution occurs, and there are the spatial resolution and the wavelength resolution as quantities representing how finely the spatial direction and the wavelength direction can be recorded.

The spatial resolution and the wavelength resolution will be described with reference to FIGS. 12 and 13.

First, the spatial resolution will be described with reference to FIG. 12.

Figure 12:
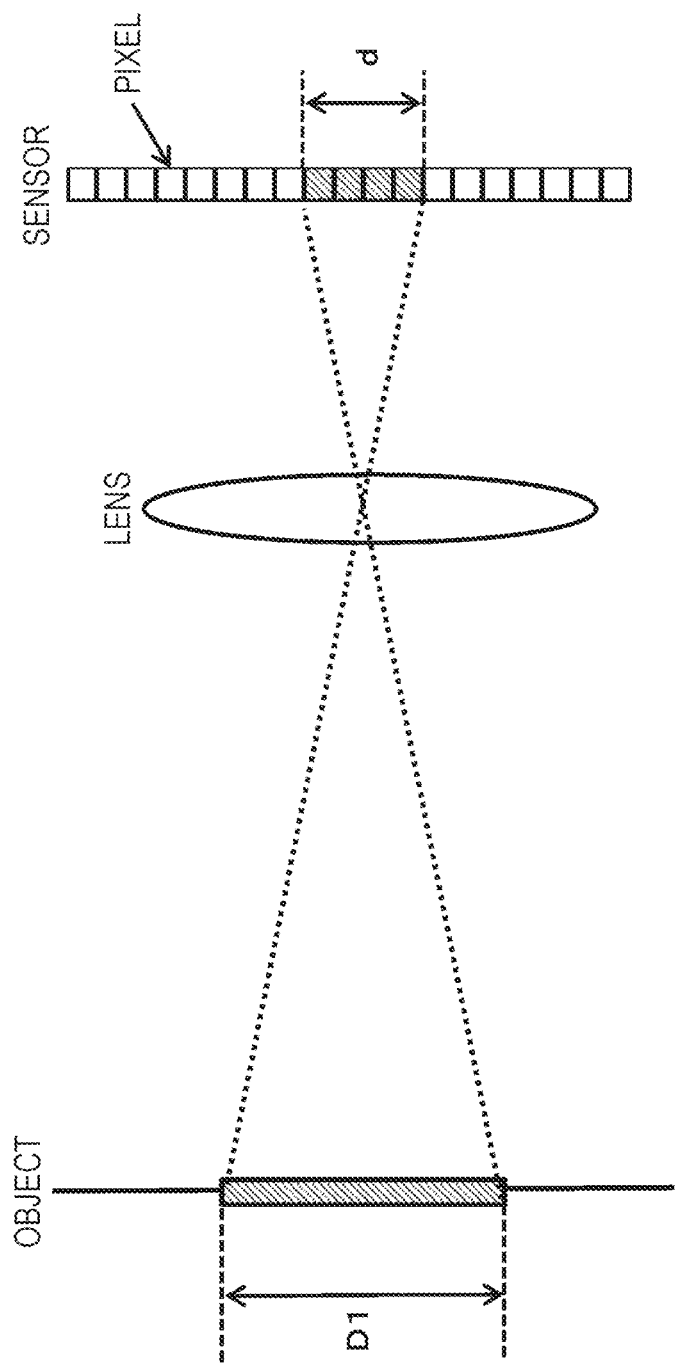
FIG. 12 is a diagram for describing a spatial resolution.

Generally, in the case of a camera including a lens and a sensor as illustrated in FIG. 12, a certain region (D1) of an object is recorded in a certain area (d) on the sensor.

In the case of this configuration, a spatial resolution rs is expressed by (Expression 4) below.

$$rs = D1/d \quad \text{(Expression 4)}$$

Figure 13:
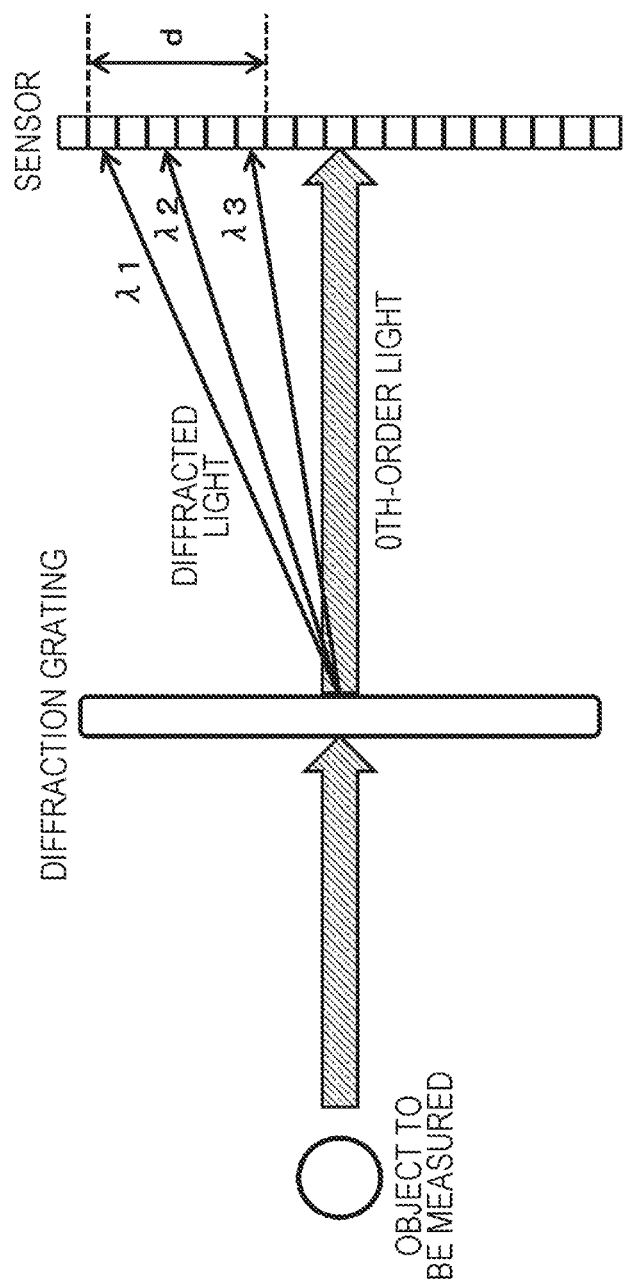
FIG. 13 is a diagram for describing a wavelength resolution.

Furthermore, in the snapshot-type spectroscopic camera of the present disclosure, that is, in the spectroscopic measurement device 100 having a diffraction grating as the spectroscopic element 104 as illustrated in FIG. 11, emitted light having passed through the diffraction grating has a different emission angle for each wavelength and is recorded at a different position on the sensor surface, as illustrated in FIG. 13. With the configuration, spectral information becomes recordable.

In such a configuration, in a case where light in a wavelength range from λ1 to λ3 is recorded in d pixels on the sensor surface, the wavelength resolution rw is expressed by (Expression 5) below.

$$rw = (\lambda 3 - \lambda 1)/d \quad \text{(Expression 5)}$$

As described above, the spectroscopic measurement device 100 of the present disclosure has the configuration for enabling independent adjustment of the spatial resolution and the wavelength resolution.

Figure 14:
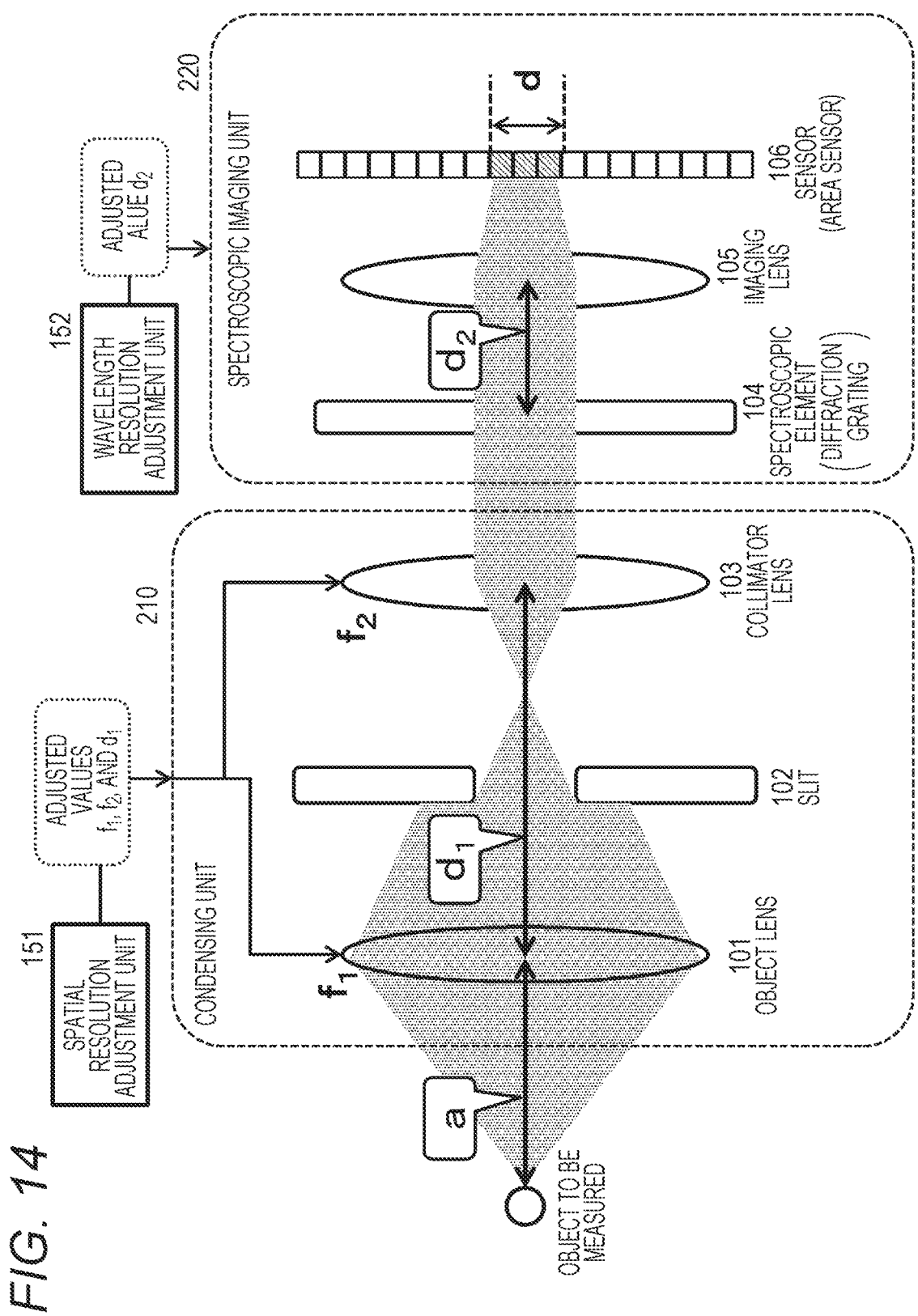
FIG. 14 is a diagram for describing a condensing unit and a spectroscopic imaging unit of the spectroscopic measurement device according to the present disclosure.

The spectroscopic measurement device 100 of the present disclosure illustrated in FIG. 11 can be optically divided into two parts with reference to the collimator lens 103. That is, as illustrated in FIG. 14, the spectroscopic measurement device 100 is divided into a condensing unit 210 including the objective lens 101, the slit (field diaphragm) 102, and the collimator lens 103, and a spectroscopic imaging unit 220 including the spectroscopic element 104, the imaging lens 105, and the sensor (area sensor) 106.

The spatial resolution adjustment unit 151 controls the objective lens 101, the slit (field diaphragm) 102, and the collimator lens 103 of the condensing unit 210 to adjust the spatial resolution of the spectroscopic measurement device 100. Meanwhile, the wavelength resolution adjustment unit 152 controls the imaging lens 105 and the sensor (area sensor) 106 of the spectroscopic imaging unit 220 to control the wavelength resolution.

Since the condensing unit 210 and the spectroscopic imaging unit 220 are connected by optically parallel light, the condensing unit 210 and the spectroscopic imaging unit 220 are independent of each other, and no functional interference occurs, that is, the spatial resolution and the wavelength resolution can be adjusted independently of each other.

Next, a specific example of processing by the spatial resolution adjustment unit 151, that is, a specific example of processing in which the spatial resolution adjustment unit 151 controls the objective lens 101, the slit (field diaphragm) 102, and the collimator lens 103 of the condensing unit 210 to adjust the spatial resolution of the spectroscopic measurement device 100 will be described.

The spatial resolution adjustment unit 151 independently adjusts the spatial resolution by changing a field range (D) while keeping a range (d) of a projected image on the sensor surface constant according to the above-described calculation expression of the spatial resolution (rs), that is:

$$rs = D1/d \quad \text{(Expression 4)}$$

on the assumption that the distance to the object to be measured (a) (=the distance from the objective lens 101 to the object to be measured) is unchanged.

In a general camera, the magnification of the lens is changed and the spatial resolution can be adjusted by adjusting a focal length ($f_1$) of the objective lens.

In the spectroscopic measurement device 100 of the present disclosure having the configuration illustrated in FIG. 11, the spatial resolution (rs) can be expressed by (Expression 6) below.

$$rs = D/d(f_1/(a-f_1)) \quad \text{(Expression 6)}$$

Note that

D: an imaging range (field range) of the object to be measured, d: a projection range on the sensor surface (for example, the number of projected pixels), $f_1$: a focal length of the objective lens, and a: the distance to the object to be measured (the distance from the objective lens 101).

In the spectroscopic measurement device 100 of the present disclosure having the configuration illustrated in FIG. 11, the spatial resolution adjustment unit 151 first receives an input of a target spatial resolution setting value (rs) from an input unit, for example. Next, the spatial resolution adjustment unit 151 calculates the focal length ($f_1$) of the objective lens 101 for setting the input spatial resolution setting value (rs) according to (Expression 6) above.

However, the spectroscopic measurement device 100 of the present disclosure having the configuration illustrated in FIG. 11 needs to make the incident light on the spectroscopic element (diffraction grating) 104 be parallel light.

Generally, the focal length ($f_2$ in FIG. 14) of the collimator lens 103 and the distance ($d_1$ in FIG. 14) between the objective lens 101 and the collimator lens 103 are fixed in accordance with the distance a (the distance a in FIG. 14) to the object to be measured and the focal length ($f_1$ in FIG. 14) of the objective lens 101. Therefore, the emitted light from the collimator lens 103 will not be parallel light if the focal length $f_1$ of the objective lens 101 is unilaterally changed.

The spatial resolution adjustment unit 151 of the spectroscopic measurement device 100 of the present disclosure simultaneously adjusts the distance ($d_1$) between the objective lens 101 and the collimator lens 103 and the focal length ($f_2$) of the collimator lens 103 in addition to the focal length ($f_1$) of the objective lens 101, as illustrated in FIG. 14, so as to maintain the emitted light from the collimator lens 103 as parallel light.

To make the input light to the spectroscopic imaging unit 220 be parallel light even if the focal length ($f_1$) of the objective lens 101 is adjusted, the distance ($d_1$) between the objective lens 101 and the collimator lens 103 is set to a calculated value of (Expression 7) below. Furthermore, the focal length ($f_2$) of the collimator lens 103 is set to a calculated value of (Expression 8) below.

$$d_1 = (a \cdot f_1)/(a-f_1) \quad \text{(Expression 7)}$$

$$f_2 = d_1 \quad \text{(Expression 8)}$$

The spatial resolution adjustment unit 151 of the spectroscopic measurement device 100 of the present disclosure adjusts the focal length ($f_1$) of the objective lens 101 for setting the target spatial resolution setting value (rs) calculated according to (Expression 6) above, the distance ($d_1$) between the objective lens 101 and the collimator lens 103 calculated according to (Expression 7) and (Expression 8) above, and the focal length ($f_2$) of the collimator lens 103 together.

Thereby, the spatial resolution can be adjusted while the input light from the condensing unit 210 to the spectroscopic imaging unit 220 is maintained as parallel light.

That is, the spatial resolution can be adjusted without causing an influence on the wavelength resolution.

Next, a method of independently adjusting the wavelength resolution will be described.

Figure 15:
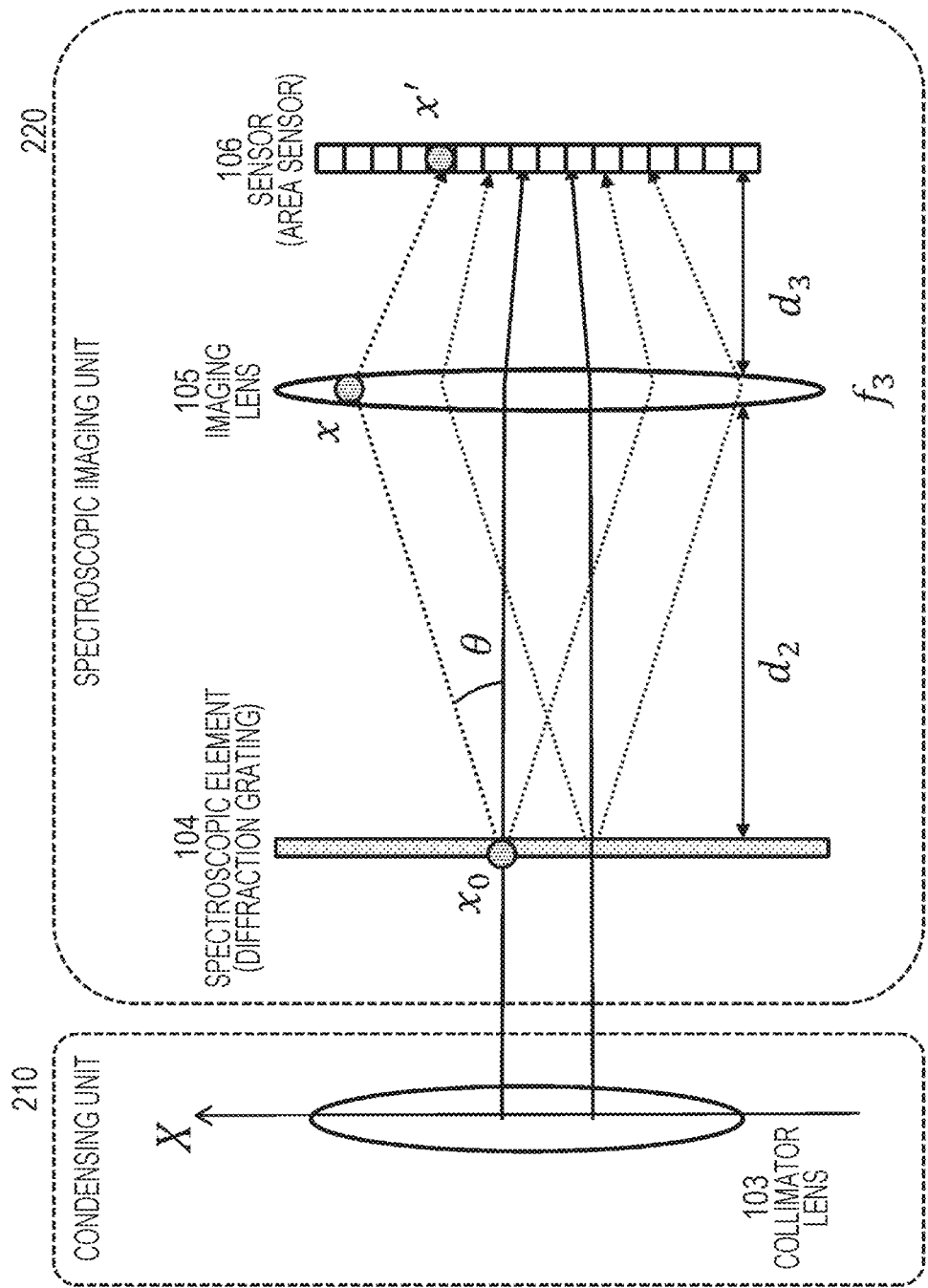
FIG. 15 is a diagram for describing a behavior of a light beam in the spectroscopic imaging unit.

FIG. 15 illustrates a behavior of a light beam in the spectroscopic imaging unit 220 illustrated in FIG. 14.

A precondition is that incident light from the collimator lens 103 of the condensing unit 210 to the spectroscopic element 104 of the spectroscopic imaging unit 220 is parallel light. The emitted light from the spectroscopic element 104 is divided into 0th-order light and nth-order diffracted light having an emission angle θ corresponding to each wavelength.

Furthermore, an X axis is set to an up direction, as illustrated in FIG. 15, and assuming that light at an incident position $x_0$ of an end portion of the light beam (input parallel light from the condensing unit 210) to the spectroscopic element 104 reaches x on the imaging lens 105 with the focal length of $f_3$ at a position separated by a distance $d_2$, and reaches x' on the sensor 106 at a position separated by a distance $d_3$ after passing through the imaging lens 105.

In this case, the incident position x' on the sensor 106 of the light of the light (the incident position $x_0$ of the spectroscopic element 104) of the end portion of the input parallel light from the condensing unit 210 is expressed by (Expression 9) below:

$$x' = ((f_3-d_3)/f_3) \cdot x + d_3 \tan \theta \quad \text{(Expression 9)}$$

Note that $$x = d_2 \cdot \tan \theta + x_0 \quad \text{(Expression 10)}.$$

Note that in (Expression 9) and (Expression 10) described above, $x_0$: an incident position of the end portion of the incident light (parallel light) on the spectroscopic element (diffraction grating) 104, θ: a diffraction angle of the spectroscopic element (diffraction grating) 104, $f_3$: the focal length of the imaging lens 105, $d_2$: the distance between the spectroscopic element (diffraction grating) 104 and the imaging lens 105, $d_3$: the distance between the imaging lens 105 and the sensor 106, and x: the position of light on the imaging lens 105.

As can be understood from (Expression 9) above, the position x' on the sensor 106 at which the light of the end portion of the light beam (input parallel light from the condensing unit 210) to the spectroscopic element 104 is incident depends on the following values:

$x_0$: the incident position of the end portion of the incident light (parallel light) on the spectroscopic element (diffraction grating) 104;

θ: the diffraction angle of the spectroscopic element (diffraction grating) 104;

$f_3$: the focal length of the imaging lens 105;

$d_2$: the distance between the spectroscopic element (diffraction grating) 104 and the imaging lens 105; and $d_3$: the distance between the imaging lens 105 and the sensor 106.

Among these values, the diffraction angle θ of the spectroscopic element (diffraction grating) 104, that is, the spectral angle θ for each wavelength is a fixed value determined according to the specification of the spectroscopic element 104. Furthermore, the incident position $x_0$ of the incident light on the spectroscopic element (diffraction grating) 104 is a position determined according to the configuration of the condensing unit 210.

Here, if the focal length $f_3$ of the imaging lens 105 and the distance $d_3$ between the imaging lens 105 and the sensor 106 are fixed, the position x' on the sensor 106 at which the light of the end portion of the light beam (input parallel light from the condensing unit 210) to the spectroscopic element 104 becomes a function of only the distance $d_2$ between the spectroscopic element (diffraction grating) 104 and the imaging lens 105.

Therefore, the position x' on the sensor 106 at which the light of the end portion of the input parallel light from the condensing unit 210 is incident can be controlled by adjusting the distance $d_2$ between the spectroscopic element (diffraction grating) 104 and the imaging lens 105.

The projection range (d) of a spectral image on the surface of the sensor 106 described above with reference to FIG. 12 can be adjusted by controlling the position x' on the sensor 106 at which the light of the end portion of the parallel light input from the condensing unit 210.

The projection range (d) of the spectral image on the surface of the sensor 106 is a calculation parameter of (Expression 5) for calculating the wavelength resolution (rw) described above, as described below:

$$rw = (\lambda 3 - \lambda 1)/d \qquad \text{(Expression 5)}$$

Therefore, the position x' on the sensor 106 at which the light of the end portion of the parallel light input from the condensing unit 210 is incident can be controlled by adjusting the distance $d_2$ between the spectroscopic element (diffraction grating) 104 and the imaging lens 105, and as a result, the wavelength resolution (rw) can be controlled.

The wavelength resolution adjustment unit 152 of the spectroscopic measurement device 100 of the present disclosure first receives an input of the target wavelength resolution setting value (rw) from the input unit, for example. Next, the wavelength resolution adjustment unit 152 calculates the projection range (d) of the spectral image on the surface of the sensor 106 for setting the input wavelength resolution setting value (rw) according to (Expression 5) above.

Next, the position x' of the end portion of the projection range is obtained from the calculated projection range (d) of the spectral image on the surface of the sensor 106. This calculated value x' corresponds to x' of (Expression 9) for the incident position x' on the sensor 106 of the light of the light (the incident position $x_0$ of the spectroscopic element 104) of the end portion of the input parallel light from the condensing unit 210, that is, corresponds to x' of (Expression 9) below:

$$x' = ((f_3 - d_3)/f_3) \cdot x + d_3 \tan \theta \qquad \text{(Expression 9)}.$$

Note that $$x = d_2 \cdot \tan \theta + x_0 \qquad \text{(Expression 10)}.$$

Next, the distance ($d_2$) between the spectroscopic element (diffraction grating) 104 and the imaging lens 105 is calculated by substituting the calculated x' in (Expression 9) and (Expression 10) above and further substituting the following fixed values:

$x_0$: the incident position of the end portion of the incident light (parallel light) on the spectroscopic element (diffraction grating) 104;

$\theta$: the diffraction angle of the spectroscopic element (diffraction grating) 104;

$f_3$: the focal length of the imaging lens 105; and $d_3$: the distance between the imaging lens 105 and the sensor 106.

The wavelength resolution adjustment unit 152 performs adjustment using the calculation parameter ($d_2$) as an adjustment parameter. That is, the distance between the spectroscopic element (diffraction grating) 104 and the imaging lens 105 is adjusted to match the calculation parameter ($d_2$).

In this way, the wavelength resolution adjustment unit 152 adjusts the wavelength resolution of the spectroscopic measurement device 100.

Note that, since the focal length $f_3$ of the imaging lens 105 and the distance $d_3$ between the imaging lens 105 and the sensor 106 are fixed, the projection magnification of a 0th-order light component that is incident as the parallel light from the condensing unit 210 does not change, and the projection range on the sensor 106 does not change, that is, the spatial resolution does not change.

As described above, the wavelength resolution adjustment unit 152 of the spectroscopic measurement device 100 of the present disclosure controls the distance $d_2$ between the spectroscopic element (diffraction grating) 104 and the imaging lens 105, thereby controlling the wavelength resolution without changing the spatial resolution.

4. Data Cube Restoration Processing in Arithmetic Processing Unit

As described above with reference to FIG. 11, the light in which various wavelength lights from various positions on the object to be measured are superimposed is recorded in each element (pixel) of the sensor (area sensor) 106.

The arithmetic processing unit 153 executes arithmetic processing of acquiring an output value (pixel value) of each element (pixel) of the sensor (area sensor) 106 and restoring the position (x, y) of the object to be measured and the wavelength light ($\lambda$: spectrum information) corresponding to each position on the basis of the output value of each element (pixel).

That is, the arithmetic processing unit 153 generates the data cube including three-dimensional data in the spatial direction (XY) and the wavelength direction ($\lambda$) of the object to be measured described above with reference to FIG. 6, and records the data cube in the recording unit 154.

Figure 16:
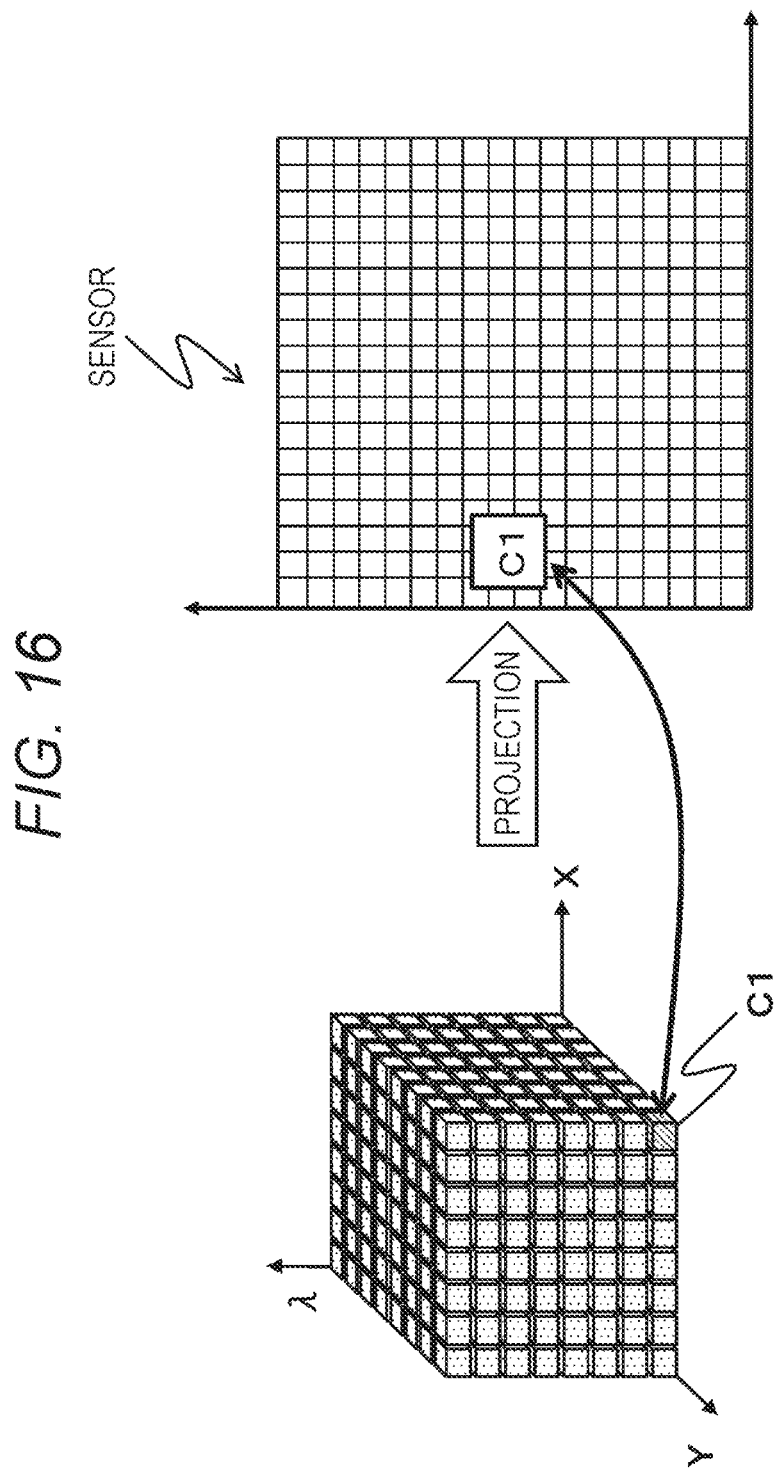
FIG. 16 is a diagram for describing a correspondence relationship between a data cube and received light data of a sensor in the snapshot method.

As illustrated in FIG. 16, in the snapshot method, a value of one block data (cube) Cl of the three-dimensional data cube in the spatial direction (XY) and the wavelength direction ($\lambda$) of the object to be measured is calculated from the quantity of received light of a plurality of pixels on the surface of the sensor 106. Light in which various wavelength lights from various positions on the object to be measured are superimposed is recorded in the pixels. Therefore, the arithmetic processing unit 153 needs to execute arithmetic processing of acquiring the output value (pixel value) of each element (pixel) of the sensor (area sensor) 106 and restoring a position (x, y) of an object to be measured and wavelength light ($\lambda$: spectrum information) corresponding to each position on the basis of the output value of each element (pixel).

A relational expression between the output value (pixel value) of each element (pixel) of the sensor (area sensor) 106 and each value of a constituent block of the data cube is expressed by (Expression 11) below:

$$g = H \cdot f + n \qquad \text{(Expression 11)}$$

In (Expression 11) above, g: an image matrix of 1×the total number of pixels, which is configured by the output values (pixel values) of the elements (pixels) of the sensor (area sensor) 106, f: a matrix of 1×data cube size, which is configured by the values of the constituent blocks of the data cube, H: a projection transformation matrix, and n: a sensor noise.

The projection transformation matrix (H) is a matrix that can be acquired by prior calibration if the optical system of the spectroscopic measurement device is determined. Therefore, the projection transformation matrix (H) can be acquired before the start of the measurement processing. The projection transformation matrix (H) corresponding to a plurality of resolutions (spatial resolution and wavelength resolution) is acquired in advance. Furthermore, the image matrix (g) of 1×the total number of pixels, which is configured by the output values (pixel values) of the elements (pixels) of the sensor (area sensor) 106, is a matrix that can be acquired from a captured image.

Therefore, imaging data (g) is known after measurement processing is executed. The data cube f can be restored, that is, the position (x, y) of the object to be measured and the wavelength light (λ: spectrum information) corresponding to each position can be restored, by repeating calculation of (Expression 12) below under the above condition.

[Math. 1]

$$f_n^{k+1} = f_n^k \cdot \left[ \frac{(H^T g)_n}{[H^T H f^k]_n} \right]^\mu \quad \text{(Expression 12)}$$

Note that μ in (Expression 12) is a control parameter that has a value range of 0 to 1 and controls a termination speed of repetitive operations.

Note that, to correctly restore the data cube f, use of the H matrix that has a one-to-one correspondence with the optical system (light condensing unit+spectroscopic imaging unit) is required. Therefore, in a conventional system, once the optical system was configured, it could never be changed.

However, in the spectroscopic measurement device 100 of the present disclosure illustrated in FIG. 11, the spatial resolution adjustment unit 151 and the wavelength resolution adjustment unit 152 can adjust a plurality of optical parameters and independently adjust the spatial resolution and the wavelength resolution of each other, as described above with reference to FIG. 14.

Specifically, the spatial resolution adjustment unit 151 can adjust the following optical parameters:

the focal length ($f_1$) of the objective lens 101;

the distance ($d_1$ in FIG. 14) between the objective lens 101 and the collimator lens 103; and the focal length ($f_2$) of the collimator lens 103, and independently adjust only the spatial resolution.

Furthermore, the wavelength resolution adjustment unit 152 can adjust the following optical parameter:

the distance ($d_2$ in FIG. 14) between the spectroscopic element (diffraction grating) 104 and the imaging lens 105, and independently adjust only the wavelength resolution.

Note that the spectroscopic measurement device 100 of the present disclosure has the configuration capable of adjusting the plurality of optical parameters and independently adjusting the spatial resolution and the wavelength resolution. Therefore, it is necessary to prepare in advance and use the projection transformation matrix (H) according to the configuration after adjustment of the optical parameters in order to restore the data cube f using (Expression 12) above.

FIG. 17 is a diagram for describing the optical parameters adjusted by the spatial resolution adjustment unit 151 and the wavelength resolution adjustment unit 152 of the spectroscopic measurement device 100 of the present disclosure.

FIG. 17 illustrates the following nine types of parameters that define the configuration of the spectroscopic measurement device:

(1) the objective lens focal length $f_1$;

(2) the distance $d_1$ between the objective lens and the collimator lens;

(3) the slit opening diameter p;

(4) the collimator lens focal length $f_2$;

(5) the spectroscopic element (diffraction grating) opening diameter g;

(6) the distance $d_2$ between the spectroscopic element and the imaging lens;

(7) the distance $d_{21}$ between the collimator lens and the imaging lens;

(8) the imaging lens focal length $f_3$; and (9) the distance $d_3$ between the imaging lens and the sensor.

Among the nine types of parameters, the spatial resolution adjustment unit 151 of the spectroscopic measurement device 100 of the present disclosure adjusts the following three types of parameters:

(1) the objective lens focal length $f_1$;

(2) the distance $d_1$ between the objective lens and the collimator lens; and (4) the collimator lens focal length $f_2$.

That is, the spatial resolution adjustment unit 151 of the spectroscopic measurement device 100 of the present disclosure calculates the focal length ($f_1$) of the objective lens 101 for setting the target spatial resolution setting value (rs) calculated according to the above-described calculation expression of the spatial resolution (rs), that is, (Expression 6) below:

$$rs = D/d(f_1/(a-f_1)) \quad \text{(Expression 6)}.$$

Moreover, the spatial resolution adjustment unit 151 calculates the distance ($d_1$) between the objective lens 101 and the collimator lens 103 and the focal length ($f_2$) of the collimator lens 103 according to (Expression 7) and (Expression 8) described above, which are conditional expressions for making the input light to the spectroscopic imaging unit 220 be parallel light, that is, (Expression 7) and (Expression 8) below:

$$d_1 = (a \cdot f_1)/(a - f_1) \quad \text{(Expression 7); and}$$

$$f_2 = d_1 \quad \text{(Expression 8)}.$$

The spatial resolution adjustment unit 151 adjusts the following three types of parameters:

(1) the objective lens focal length $f_1$;

(2) the distance $d_1$ between the objective lens and the collimator lens; and (4) the collimator lens focal length $f_2$ on the basis of the above three calculated values.

Meanwhile, the wavelength resolution adjustment unit 152 adjusts the parameter:

(6) the distance $d_2$ between the spectroscopic element and the imaging lens among the nine types of parameters described above.

That is, the wavelength resolution adjustment unit 152 of the spectroscopic measurement device 100 of the present disclosure calculates the projection range (d) of the spectral image on the surface of the sensor 106 for setting the target wavelength resolution setting value (rw) calculated according to the above-described calculation expression of the wavelength resolution (rw), that is, (Expression 5) below:

$$rw = (\lambda 3 - \lambda 1)/d \quad \text{(Expression 5).}$$

Next, the position x' of the end portion of the projection range is obtained from the calculated projection range (d) of the spectral image on the surface of the sensor 106. This calculated value x' corresponds to x' of (Expression 9) for the incident position x' on the sensor 106 of the light of the light (the incident position $x_0$ of the spectroscopic element 104) of the end portion of the input parallel light from the condensing unit 210, that is, corresponds to x' of (Expression 9) below:

$$x' = ((f_3 - d_3)/f_3) \cdot x + d_3 \tan \theta \quad \text{(Expression 9).}$$

Note that $$x = d_2 \cdot \tan \theta + x_0 \quad \text{(Expression 10).}$$

Next, the distance ($d_2$) between the spectroscopic element (diffraction grating) 104 and the imaging lens 105 is calculated by substituting the calculated x' in (Expression 9) and (Expression 10) above and further substituting the following fixed values:

$x_0$: the incident position of the end portion of the incident light (parallel light) on the spectroscopic element (diffraction grating) 104;

θ: the diffraction angle of the spectroscopic element (diffraction grating) 104;

$f_3$: the focal length of the imaging lens 105; and $d_3$: the distance between the imaging lens 105 and the sensor 106.

The wavelength resolution adjustment unit 152 adjusts the parameter:

(6) the distance $d_2$ between the spectroscopic element and the imaging lens on the basis of the calculated values.

Note that, in the example illustrated in FIG. 17, an example in which the spatial resolution adjustment unit 151 adjusts the following three types of parameters:

(1) the objective lens focal length $f_1$;

(2) the distance $d_1$ between the objective lens and the collimator lens; and (4) the collimator lens focal length $f_2$, and the wavelength resolution adjustment unit 152 adjusts the one type of parameter:

(6) the distance $d_2$ between the spectroscopic element and the imaging lens has been described. However, the spatial resolution adjustment unit 151 and the wavelength resolution adjustment unit 152 may adjust parameters other than the above-described parameters.

For example, as illustrated in FIG. 18, the spatial resolution adjustment unit 151 may be set to adjust the following four types of parameters:

(1) the objective lens focal length $f_1$;

(2) the distance $d_1$ between the objective lens and the collimator lens;

(3) the slit opening diameter p; and (4) the collimator lens focal length $f_2$.

All of these parameters are parameters capable of changing the spatial resolution.

Meanwhile, the wavelength resolution adjustment unit 152 may be set to adjust the following four types of parameters:

(1) the objective lens focal length $f_1$;

(6) the distance $d_2$ between the spectroscopic element and the imaging lens;

(8) the imaging lens focal length $f_3$; and (9) the distance $d_3$ between the imaging lens and the sensor.

All of these parameters are parameters capable of changing the wavelength resolution.

Figure 19:
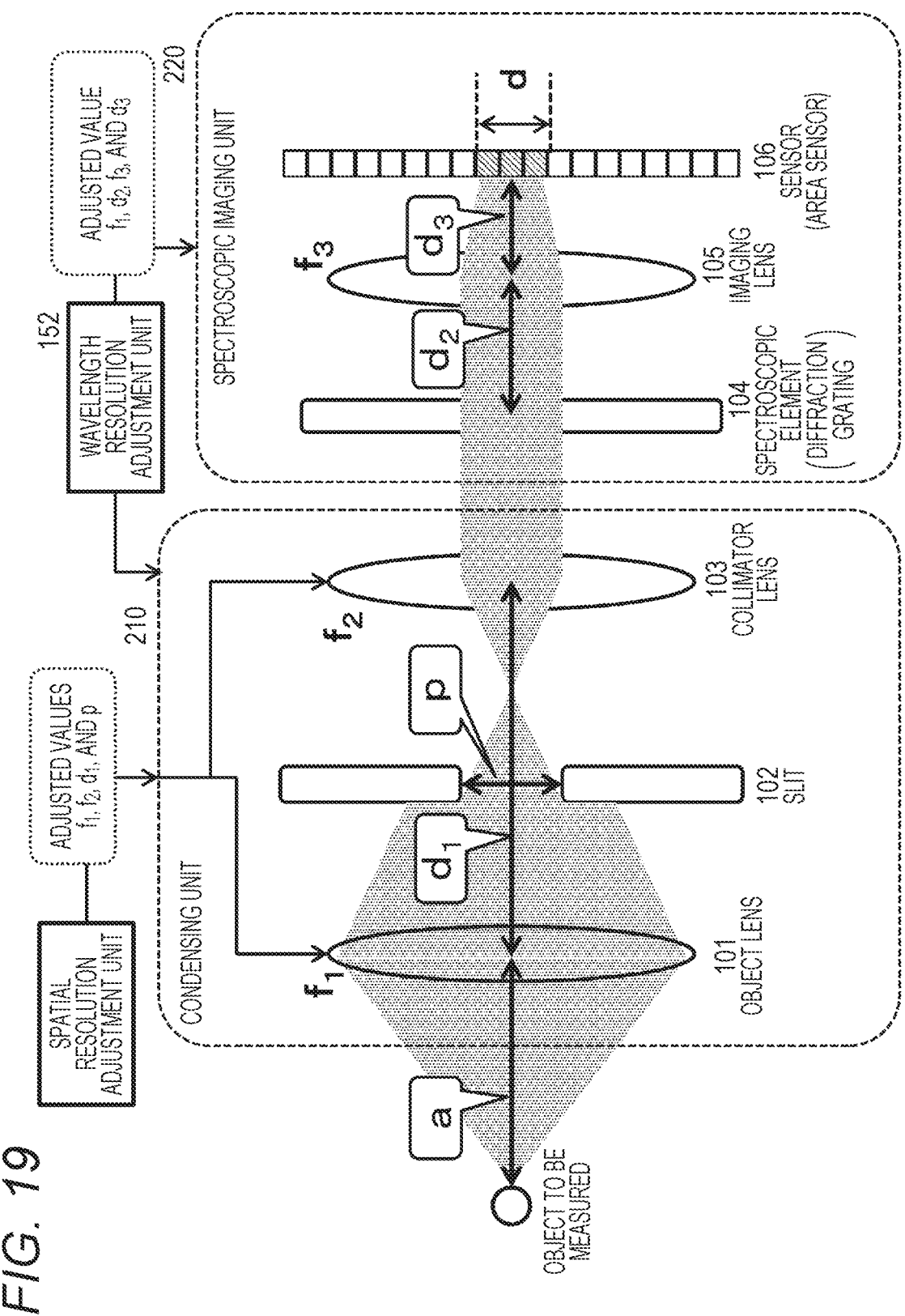
FIG. 19 is a diagram for describing the optical parameters adjusted by the spatial resolution adjustment unit and the wavelength resolution adjustment unit of the spectroscopic measurement device of the present disclosure.

However, the condition is that the emitted light from the condensing unit 210 to the spectroscopic imaging unit 220 is maintained as the parallel light in the end, as illustrated in FIG. 19.

To maintain the emitted light from the condensing unit 210 to the spectroscopic imaging unit 220 as the parallel light, it is only required to set the following parameters:

the distance ($d_1$) between the objective lens 101 and the collimator lens 103; and the focal length ($f_2$) of the collimator lens 103 to satisfy the conditional expressions (Expression 7) and (Expression 8) described above, that is, (Expression 7) and (Expression 8) below:

$$d_1 = (a \cdot f_1)/(a - f_1) \quad \text{(Expression 7); and}$$

$$f_2 = d_1 \quad \text{(Expression 8).}$$

That is, as illustrated in FIGS. 18 and 19, even when the spatial resolution adjustment unit 151 adjusts the four types of parameters:

(1) the objective lens focal length $f_1$;

(2) the distance $d_1$ between the objective lens and the collimator lens;

(3) the slit opening diameter p; and (4) the collimator lens focal length $f_2$, and the wavelength resolution adjustment unit 152 adjusts the following parameters:

(1) the objective lens focal length $f_1$;

(6) the distance $d_2$ between the spectroscopic element and the imaging lens;

(8) the imaging lens focal length $f_3$; and (9) the distance $d_3$ between the imaging lens and the sensor, the emitted light from the condensing unit 210 to the spectroscopic imaging unit 220 can be maintained as parallel light as long as the parameters:

the distance ($d_1$) between the objective lens 101 and the collimator lens 103; and the focal length ($f_2$) of the collimator lens 103 are adjusted to satisfy (Expression 7) and (Expression 8) above in the end.

The spatial resolution adjustment unit 151 and the wavelength resolution adjustment unit 152 are allowed to adjust various parameters as illustrated in FIGS. 18 and 19 as long as the condition of maintaining the emitted light from the condensing unit 210 to the spectroscopic imaging unit 220 as parallel light is satisfied.

5. Sequence of Processing Executed by Spectroscopic Measurement Device of Present Disclosure Next, a sequence of processing executed by the spectroscopic measurement device 100 of the present disclosure will be described with reference to the flowchart illustrated in FIG. 20.

Hereinafter, the processing of each step of the flowchart illustrated in FIG. 20 will be sequentially described.

(Step S101)

First, in step S101, spatial resolution adjustment processing is executed.

This processing is executed by the spatial resolution adjustment unit 151 of the spectroscopic measurement device 100 illustrated in FIG. 11.

The spatial resolution adjustment unit 151 calculates the focal length ($f_1$) of the objective lens 101 for setting the target spatial resolution setting value (rs) calculated according to the above-described calculation expression of the spatial resolution (rs), that is, (Expression 6) below:

$$rs = D/d(f_1/(a-f_1)) \quad \text{(Expression 6)}.$$

Moreover, the spatial resolution adjustment unit 151 calculates the distance ($d_1$) between the objective lens 101 and the collimator lens 103 and the focal length ($f_2$) of the collimator lens 103 according to (Expression 7) and (Expression 8) described above, which are conditional expressions for making the input light to the spectroscopic imaging unit 220 be parallel light, that is, (Expression 7) and (Expression 8) below:

$$d_1 = (a \cdot f_1)/(a-f_1) \quad \text{(Expression 7); and}$$

$$f_2 = d_1 \quad \text{(Expression 8)}.$$

The spatial resolution adjustment unit 151 adjusts the following three types of parameters:

the objective lens focal length $f_1$;

the distance $d_1$ between the objective lens and the collimator lens; and the collimator lens focal length $f_2$ on the basis of the above three calculated values.

(Step S102)

The processing in step S102 is processing executable in parallel with the processing in step S101.

In step S102, wavelength resolution adjustment processing is executed.

This processing is executed by the wavelength resolution adjustment unit 152 of the spectroscopic measurement device 100 illustrated in FIG. 11.

The wavelength resolution adjustment unit 152 calculates the projection range (d) of the spectral image on the surface of the sensor 106 for setting the target wavelength resolution setting value (rw) calculated according to the above-described calculation expression of the wavelength resolution (rw), that is, (Expression 5) below:

$$rw = (\lambda_3 - \lambda_1)/d \quad \text{(Expression 5)}.$$

Next, the position x' of the end portion of the projection range is obtained from the calculated projection range (d) of the spectral image on the surface of the sensor 106. This calculated value x' corresponds to x' of (Expression 9) for the incident position x' on the sensor 106 of the light of the light (the incident position $x_0$ of the spectroscopic element 104) of the end portion of the input parallel light from the condensing unit 210, that is, corresponds to x' of (Expression 9) below:

$$x' = ((f_3 - d_3)/f_3) \cdot x + d_3 \tan \theta \quad \text{(Expression 9)}.$$

Note that $$x = d_2 \cdot \tan \theta + x_0 \quad \text{(Expression 10)}.$$

Next, the distance ($d_2$) between the spectroscopic element (diffraction grating) 104 and the imaging lens 105 is calculated by substituting the calculated x' in (Expression 9) and (Expression 10) above and further substituting the following fixed values:

$x_0$: the incident position of the end portion of the incident light (parallel light) on the spectroscopic element (diffraction grating) 104;

θ: the diffraction angle of the spectroscopic element (diffraction grating) 104;

$f_3$: the focal length of the imaging lens 105; and $d_3$: the distance between the imaging lens 105 and the sensor 106.

The wavelength resolution adjustment unit 152 adjusts the parameter:

the distance $d_2$ between the spectroscopic element and the imaging lens on the basis of the calculated values.

Note that, in the spatial resolution adjustment processing in step S101 and in the wavelength resolution adjustment processing in step S102, the spatial resolution adjustment unit 151 and the wavelength resolution adjustment unit 152 are allowed to adjust various parameters, as illustrated in FIGS. 18 and 19, as long as the condition of maintaining the emitted light from the condensing unit 210 to the spectroscopic imaging unit 220 as parallel light is satisfied, as described with reference to FIGS. 18 and 19.

(Step S103)

Next, in step S103, the object to be measured is imaged.

This processing is image capturing processing by the spectroscopic measurement device 100 illustrated in FIG. 11.

(Step S104)

Next, in step S104, pixel value reading processing is executed.

This processing is processing of outputting the pixel values of the pixels of the sensor 106 of the spectroscopic measurement device 100 illustrated in FIG. 11 to the arithmetic processing unit 153.

(Step S105)

Next, in step S105, restoration processing is executed.

This processing is processing executed by the arithmetic processing unit 153 of the spectroscopic measurement device 100 illustrated in FIG. 11.

The arithmetic processing unit 153 executes arithmetic processing of acquiring an output value (pixel value) of each element (pixel) of the sensor (area sensor) 106 and restoring the position (x, y) of the object to be measured and the wavelength light (λ: spectrum information) corresponding to each position on the basis of the output value of each element (pixel).

That is, the arithmetic processing unit 153 generates the three-dimensional data cube in the spatial direction (XY) and the wavelength direction (λ) of the object to be measured described above with reference to FIG. 6.

The relational expression between the output value (pixel value) of each element (pixel) of the sensor (area sensor) 106 and each value of a constituent block of the data cube is expressed by the above-described (Expression 11) below:

$$g = H \cdot f + n \quad \text{(Expression 11)}$$

In (Expression 11) above, g: the image matrix of 1×the total number of pixels, which is configured by the output values (pixel values) of the elements (pixels) of the sensor (area sensor) 106, f: the matrix of 1×data cube size, which is configured by the values of the constituent blocks of the data cube, H: the projection transformation matrix, and n: the sensor noise.

The projection transformation matrix (H) is a matrix that can be acquired by prior calibration if the optical system of the spectroscopic measurement device is determined. Therefore, the projection transformation matrix (H) can be acquired before the start of the measurement processing. Furthermore, the image matrix (g) of 1×the total number of pixels, which is configured by the output values (pixel values) of the elements (pixels) of the sensor (area sensor) 106, is a matrix that can be acquired from a captured image.

The imaging data (g), the projection transformation matrix (H), and the noise (n) are known, and the arithmetic processing unit 153 restores the data cube f, that is, the position (x, y) of the object to be measured and the wavelength light (A: spectrum information) corresponding to each position by repeating calculation of (Expression 12) described above.

(Step S106)

Finally, in step S106, the arithmetic processing unit 153 records the data cube including three-dimensional data in the spatial direction (XY) and the wavelength direction ($\lambda$) of the imaged object to be measured in the recording unit 154.

As described above, the spectroscopic measurement device 100 of the present disclosure can independently adjust the spatial resolution and the wavelength resolution in steps S101 and S102, set the desired spatial resolution and wavelength resolution, and generate and record the data cube including three-dimensional data in the spatial direction (XY) and the wavelength direction ($\lambda$) of the object to be measured.

6. Conclusion of Configuration of Present Disclosure

The examples of the present disclosure have been described in detail with reference to the specific examples. However, it is obvious that those skilled in the art can make modifications and substitutions of the examples without departing from the gist of the present disclosure. That is, the present invention has been disclosed in the form of exemplification, and should not be restrictively interpreted. To judge the gist of the present disclosure, the scope of claims should be taken into consideration.

Note that the technology disclosed in the present specification can have the following configurations.

(1) A spectroscopic measurement device including:

a spatial resolution adjustment unit configured to adjust a spatial resolution of the spectroscopic measurement device; and a wavelength resolution adjustment unit configured to adjust a wavelength resolution of the spectroscopic measurement device, in which the spatial resolution adjustment unit changes the spatial resolution without changing the wavelength resolution of the spectroscopic measurement device.

(2) The spectroscopic measurement device according to (1), in which the wavelength resolution adjustment unit changes the wavelength resolution without changing the spatial resolution of the spectroscopic measurement device.

(3) The spectroscopic measurement device according to (1) or (2), in which the spatial resolution adjustment unit changes the spatial resolution to satisfy a condition of maintaining output light from a condensing unit to a spectroscopic imaging unit of the spectroscopic measurement device as parallel light.

(4) The spectroscopic measurement device according to any one of (1) to (3), in which the spatial resolution adjustment unit adjusts a parameter of a constituent element of a condensing unit of the spectroscopic measurement device and changes the spatial resolution.

(5) The spectroscopic measurement device according to any one of (1) to (4), in which the spatial resolution adjustment unit adjusts at least one of following parameters (a) to (c) and changes the spatial resolution:

(a) a focal length of an objective lens;

(b) a distance between the objective lens and a collimator lens; and (c) a focal length of the collimator lens, the parameters being parameters of constituent elements of a condensing unit of the spectroscopic measurement device.

(6) The spectroscopic measurement device according to any one of (1) to (5), in which the wavelength resolution adjustment unit adjusts a parameter of a constituent element of a spectroscopic imaging unit of the spectroscopic measurement device and changes the wavelength resolution.

(7) The spectroscopic measurement device according to any one of (1) to (6), in which the wavelength resolution adjustment unit adjusts a distance between a spectroscopic element and an imaging lens, the distance being a parameter of a constituent element of a spectroscopic imaging unit of the spectroscopic measurement device, and changes the wavelength resolution.

(8) The spectroscopic measurement device according to any one of (1) to (7), further including:

an arithmetic processing unit configured to execute arithmetic processing of inputting a received light signal value of a sensor of the spectroscopic measurement device, in which the arithmetic processing unit executes arithmetic processing of acquiring a pixel value of each pixel of the sensor and restoring a position (x, y) of an object to be measured and wavelength light ($\lambda$: spectrum information) corresponding to each position.

(9) The spectroscopic measurement device according to (8), in which the arithmetic processing unit generates a data cube including three-dimensional data in a spatial direction (XY) and a wavelength direction ($\lambda$) of the object to be measured.

(10) A spectroscopic measurement method executed by a spectroscopic measurement device, the method including:

a spatial resolution adjustment step of adjusting, by a spatial resolution adjustment unit, a spatial resolution of the spectroscopic measurement device;

a wavelength resolution adjustment step of adjusting, by a wavelength resolution adjustment unit, a wavelength resolution of the spectroscopic measurement device;

an image imaging step of causing a sensor to receive output light of an object to be measured via a condensing unit and a spectroscopic unit of the spectroscopic measurement device; and a data cube generation step of generating, by an arithmetic processing unit, a data cube including three-dimensional data in a spatial direction (XY) and a wavelength direction ($\lambda$) of the object to be measured on the basis of a pixel value of the sensor, in which the spatial resolution adjustment step by the spatial resolution adjustment unit is a step of changing the spatial resolution without changing the wavelength resolution of the spectroscopic measurement device.

Note that the various types of processing described in the description may be executed not only in chronological order as described but also in parallel or individually depending on the processing capability of the device that executes the process or as required. Furthermore, the system in the present description is a logical aggregate configuration of a plurality of devices, and is not limited to devices having respective configurations within the same housing.

INDUSTRIAL APPLICABILITY

As described above, according to the configuration of the embodiment of the present disclosure, the configuration for enabling independent adjustment of the spatial resolution and the wavelength resolution of the spectroscopic measurement device is implemented.

Specifically, for example, the spatial resolution adjustment unit configured to adjust the spatial resolution of the spectroscopic measurement device and the wavelength resolution adjustment unit configured to adjust the wavelength resolution of the spectroscopic measurement device are included, and the spatial resolution adjustment unit maintains the output light from the condensing unit to the spectroscopic imaging unit of the spectroscopic measurement device as parallel light, adjusts a parameter of a constituent element of the condensing unit, and changes the spatial resolution without changing the wavelength resolution of the spectroscopic measurement device. The wavelength resolution adjustment unit adjusts a parameter of the spectroscopic imaging unit of the spectroscopic measurement device and changes the wavelength resolution without changing the spatial resolution of the spectroscopic measurement device.

With the present configuration, the configuration for enabling independent adjustment of the spatial resolution and the wavelength resolution of the spectroscopic measurement device is implemented.

REFERENCE SIGNS LIST

100 Spectroscopic measurement device
101 Objective lens
102 Slit (field diaphragm)
103 Collimator lens
104 Spectroscopic element (diffraction grating)
105 Imaging lens
106 Sensor (area sensor)
151 Spatial resolution adjustment unit
152 Wavelength resolution adjustment unit
153 Arithmetic processing unit
154 Recording unit
210 Condensing unit
220 Spectroscopic imaging unit

The invention claimed is:

1. A spectroscopic measurement device comprising:
a spatial resolution adjustment unit configured to adjust a spatial resolution of the spectroscopic measurement device; and
a wavelength resolution adjustment unit configured to adjust a wavelength resolution of the spectroscopic measurement device, wherein
the spatial resolution adjustment unit changes the spatial resolution without changing the wavelength resolution of the spectroscopic measurement device.

2. The spectroscopic measurement device according to claim 1, wherein
the wavelength resolution adjustment unit changes the wavelength resolution without changing the spatial resolution of the spectroscopic measurement device.

3. The spectroscopic measurement device according to claim 1, wherein
the spatial resolution adjustment unit changes the spatial resolution to satisfy a condition of maintaining output light from a condensing unit to a spectroscopic imaging unit of the spectroscopic measurement device as parallel light.

4. The spectroscopic measurement device according to claim 1, wherein
the spatial resolution adjustment unit adjusts a parameter of a constituent element of a condensing unit of the spectroscopic measurement device and changes the spatial resolution.

5. The spectroscopic measurement device according to claim 1, wherein
the spatial resolution adjustment unit adjusts at least one of following parameters (a) to (c) and changes the spatial resolution:
(a) a focal length of an objective lens;
(b) a distance between the objective lens and a collimator lens; and
(c) a focal length of the collimator lens,
the parameters being parameters of constituent elements of a condensing unit of the spectroscopic measurement device.

6. The spectroscopic measurement device according to claim 1, wherein
the wavelength resolution adjustment unit adjusts a parameter of a constituent element of a spectroscopic imaging unit of the spectroscopic measurement device and changes the wavelength resolution.

7. The spectroscopic measurement device according to claim 1, wherein
the wavelength resolution adjustment unit adjusts
a distance between a spectroscopic element and an imaging lens,
the distance being a parameter of a constituent element of a spectroscopic imaging unit of the spectroscopic measurement device, and changes the wavelength resolution.

8. The spectroscopic measurement device according to claim 1, further comprising:
an arithmetic processing unit configured to execute arithmetic processing of inputting a received light signal value of a sensor of the spectroscopic measurement device, wherein
the arithmetic processing unit executes arithmetic processing of acquiring a pixel value of each pixel of the sensor and restoring a position (x, y) of an object to be measured and wavelength light ($\lambda$: spectrum information) corresponding to each position.

9. The spectroscopic measurement device according to claim 8, wherein
the arithmetic processing unit generates a data cube including three-dimensional data in a spatial direction (XY) and a wavelength direction ($\lambda$) of the object to be measured.

10. A spectroscopic measurement method executed by a spectroscopic measurement device, the method comprising:
a spatial resolution adjustment step of adjusting, by a spatial resolution adjustment unit, a spatial resolution of the spectroscopic measurement device;
a wavelength resolution adjustment step of adjusting, by a wavelength resolution adjustment unit, a wavelength resolution of the spectroscopic measurement device;

an image imaging step of causing a sensor to receive output light of an object to be measured via a condensing unit and a spectroscopic unit of the spectroscopic measurement device; and
a data cube generation step of generating, by an arithmetic processing unit, a data cube including three-dimensional data in a spatial direction (XY) and a wavelength direction ($\lambda$) of the object to be measured on a basis of a pixel value of the sensor, wherein
the spatial resolution adjustment step by the spatial resolution adjustment unit is a step of changing the spatial resolution without changing the wavelength resolution of the spectroscopic measurement device.

\* \* \* \* \*